US011267417B2

(12) United States Patent
Aizawa et al.

(10) Patent No.: US 11,267,417 B2
(45) Date of Patent: Mar. 8, 2022

(54) COLLISION DETECTING STRUCTURE

(71) Applicant: HONDA MOTOR CO., LTD., Tokyo (JP)

(72) Inventors: Teruaki Aizawa, Wako (JP); Akira Hojo, Wako (JP); Tatsuya Ishizaki, Wako (JP); Hiroyuki Midorikawa, Wako (JP)

(73) Assignee: HONDA MOTOR CO. LTD., Tokyo (JP)

( * ) Notice: Subject to any disclaimer, the term of this patent is extended or adjusted under 35 U.S.C. 154(b) by 113 days.

(21) Appl. No.: 16/650,015

(22) PCT Filed: Oct. 24, 2017

(86) PCT No.: PCT/JP2017/038408
§ 371 (c)(1),
(2) Date: Mar. 24, 2020

(87) PCT Pub. No.: WO2019/082285
PCT Pub. Date: May 2, 2019

(65) Prior Publication Data
US 2020/0276952 A1 Sep. 3, 2020

(51) Int. Cl.
B60R 19/48 (2006.01)
(52) U.S. Cl.
CPC .................... B60R 19/483 (2013.01)
(58) Field of Classification Search
CPC ............... B60R 19/483; B60R 19/023; B60R 2019/186; B60R 2019/188; F16F 2230/08
See application file for complete search history.

(56) References Cited

U.S. PATENT DOCUMENTS

| 10,668,880 | B2* | 6/2020 | Syvertsen | B60R 19/483 |
| 10,668,881 | B2* | 6/2020 | Yoshida | B60R 21/0136 |
| 11,052,846 | B2* | 7/2021 | Kim | B60R 21/0136 |
| 2008/0203742 | A1* | 8/2008 | Takahashi | B60R 19/483 |
| | | | | 293/117 |
| 2015/0114746 | A1* | 4/2015 | Nickel | B60R 13/04 |
| | | | | 180/274 |

(Continued)

FOREIGN PATENT DOCUMENTS

| DE | 102013017415 A1 | 7/2014 |
| DE | 102017201060 A1 | 8/2017 |

(Continued)

OTHER PUBLICATIONS

International Search Report by ISA/JP dated Jan. 23, 2018, on PCT/JP2017/038408, 4 pages.

(Continued)

Primary Examiner — Gregory A Blankenship
(74) Attorney, Agent, or Firm — Rankin, Hill & Clark LLP

(57) ABSTRACT

A collision detecting structure includes a pressure generating tube extending in a vehicle width direction, a rear wall portion disposed on a rear side of the pressure generating tube, a tube compressing portion disposed frontward of the pressure generating tube and including an projecting wall portion that is in a plate-like shape and extends in a vehicle front-rear direction; and a tube retaining member disposed opposite to the projecting wall portion and retaining the pressure generating tube between the projecting wall portion and the tube retaining portion.

9 Claims, 14 Drawing Sheets

(56) References Cited

U.S. PATENT DOCUMENTS

| | | | |
|---|---|---|---|
| 2016/0039376 A1* | 2/2016 | Narita | B60R 21/0136 |
| | | | 293/4 |
| 2016/0288750 A1* | 10/2016 | Nickel | B60R 19/483 |
| 2017/0174162 A1 | 6/2017 | Kwag et al. | |
| 2017/0225637 A1 | 8/2017 | Kamimura et al. | |
| 2017/0274850 A1* | 9/2017 | Aizawa | B60R 19/483 |
| 2019/0023206 A1* | 1/2019 | Yoshida | B60R 21/0136 |
| 2020/0262370 A1* | 8/2020 | Aizawa | B60R 19/483 |
| 2020/0262376 A1* | 8/2020 | Aizawa | B60R 19/483 |
| 2020/0276952 A1* | 9/2020 | Aizawa | B60R 21/0136 |
| 2021/0094495 A1* | 4/2021 | Park | B60R 19/18 |

FOREIGN PATENT DOCUMENTS

| | | |
|---|---|---|
| JP | 2014-505629 A | 3/2014 |
| JP | 2015-178316 A | 10/2015 |
| JP | 2017-100643 A | 6/2017 |
| JP | 2017-140870 A | 8/2017 |
| KR | 101689583 B1 | 12/2016 |

OTHER PUBLICATIONS

Written Opinion by ISA/JP dated Jan. 23, 2018, on PCT/JP2017/038408, 3 pages.

Chinese Office Action with English translation dated Oct. 11, 2021, 12 pages.

* cited by examiner

COLLISION DETECTING STRUCTURE

FIELD OF THE INVENTION

The present invention relates to a collision detecting structure of the vehicle.

BACKGROUND ART

Patent Document 1 describes a structure for detecting a head-on collision of a vehicle, in which a foamed material member is disposed frontward of a bumper beam and a tube is disposed between the bumper beam and the foamed material member, more specifically disposed to extend in a vehicle width direction in a recessed portion formed on a rear portion of the foamed material member. Patent Document 2 describes a structure comprising a plate-like member of a couple of face portions joined together through a bent portion and a pressure tube which is intended to detect an impact and disposed in a space between the couple of face portions. The pressure tube can be pressed between the couple of face portions and is deformable.

PRIOR ART DOCUMENT

Patent Document

Patent Document 1: JP2014-505629A
Patent Document 2: JP2015-178316A

SUMMARY OF THE INVENTION

Objective to be Achieved

However, since the structure as described in Patent Document 1 has the foamed material body deforming while absorbing a collision load when the vehicle makes a collision, there may be a risk of a delay in detecting the collision. The structure as described in Patent document 2 has the pressure tube being able to move relative to the plate-like member, the pressure tube may be displaced while the vehicle is running or when the collision occurs, which could result in failure to detect the collision.

The inventors have created the present invention taking the above mentioned issues into account. The present invention has an objective to provide a collision detecting structure capable of preventing the delay in and the failure of detecting a collision of a vehicle.

SUMMARY OF THE INVENTION

Objective to be Achieved

In order to achieve the objective above described, the collision detecting structure of the present invention has a feature of comprising a pressure generating tube disposed to extend in a vehicle width direction, a rear wall portion in a plate-like shape disposed on a rear side of the pressure generating tube, a tube compressing portion disposed frontward of the pressure generating tube and including an projecting wall portion in a plate-like shape extending in a vehicle front-rear direction, and a tube retaining member disposed opposite to the projecting wall portion and retaining the pressure generating tube between the projecting wall portion and the tube compressing portion.

Effect of the Invention

According to the present invention, the delay in and the failure of detecting a collision of a vehicle are prevented.

DESCRIPTION OF EMBODIMENTS

A collision detecting structure of an embodiment of the present invention is described in detail hereinafter, making use of an example of a vehicle front bumper to which the collision detecting structure is applied to detect a vehicle colliding, for example, with a pedestrian, with reference to the attached drawings. In the description below, identical elements are assigned an identical sign and the same description as once given is not reiterated.

Figure 1:
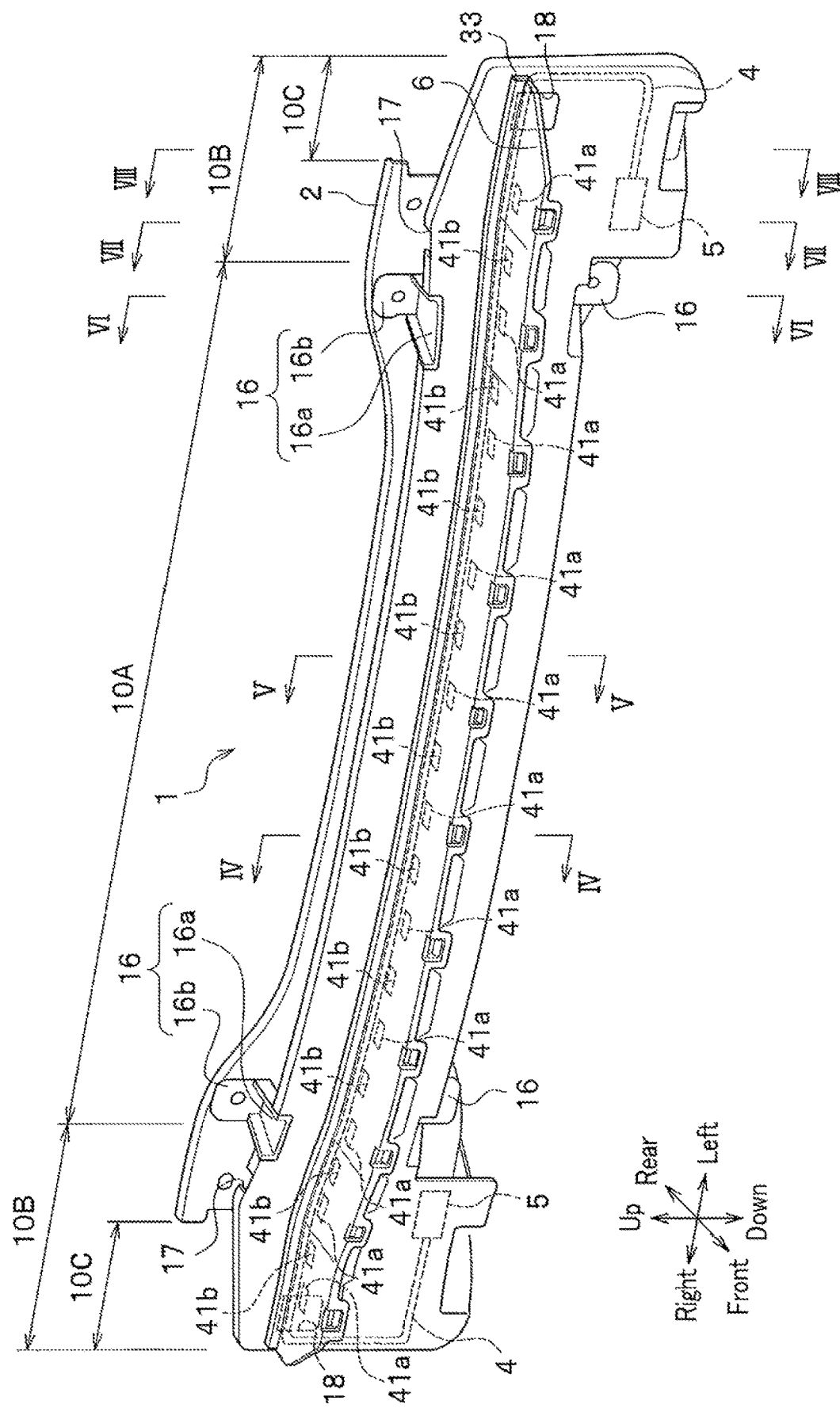
FIG. 1 is a schematic perspective view of a collision detecting structure of an embodiment of the present invention.
Figure 2:
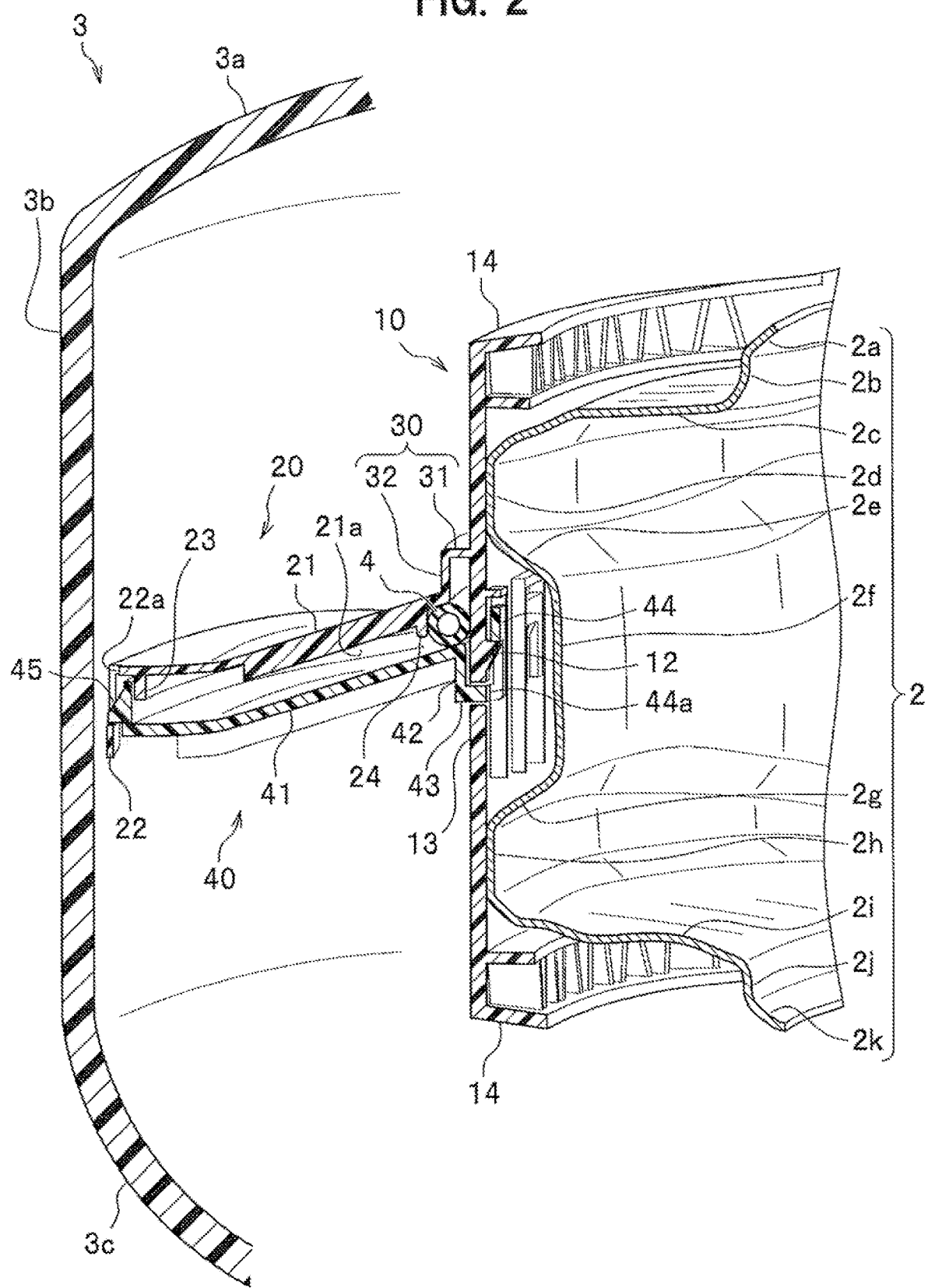
FIG. 2 is a schematic cross-sectional view of a collision detecting structure of an embodiment of the present invention.

As shown in FIG. 1, the collision detecting structure of an embodiment of the present invention is a structure intended to detect, for example, a collision of a front portion of a vehicle colliding with a collision object (for example, a pedestrian). As shown in FIG. 1 and FIG. 2, a collision detecting structure 1 is fitted between a bumper beam 2 and a bumper face 3 both disposed in the front portion of a vehicle and comprises a pressure generating tube 4 disposed to extend in the vehicle width direction, a pair of right and left pressure sensors 5, 5 both of which are connected with the pressure generating tube 4, a load transmitting member 6 and a tube retaining member 40.

<Bumper Beam>

A bumper beam 2 is a metal member extending in the vehicle width direction and disposed in the front portion of the vehicle. Both end portions in the vehicle width direction of the bumper beam 2 have a rear side portion that is joined to a frame member (front side member) of the vehicle extending in a front-rear direction of the vehicle. When the vehicle is in collision (head-on collision), the bumper beam 2 transmits a collision load applied to the bumper beam 2 to the frame member.

As seen from a cross section of the bumper beam 2 in FIG. 2 when the bumper beam 2 is viewed from a side of the bumper beam 2, the bumper beam 2 comprises an upper wall portion 2a extending in the vehicle front-rear direction, a rear wall portion 2b extending downward from a front end of the upper wall portion 2a and an upper wall portion 2c extending frontward from a lower end of the rear wall portion 2b, and the upper wall portion 2a, the rear wall portion 2b and the upper wall portion 2c are integrally formed.

As further seen from the cross section of the bumper beam 2 in FIG. 2 when the bumper beam 2 is viewed from a side of the bumper beam 2, the bumper beam 2 further comprises a front wall portion 2d extending downward from a front end of the upper wall portion 2c, an intermediate upper wall portion 2e extending rearward from a lower end of the front wall portion 2d and an intermediate front wall portion 2f extending downward from a rear end of the intermediate upper wall portion 2e, and the front wall portion 2d, the intermediate upper wall portion 2e and the intermediate front wall portion 2f are integrally formed.

As further seen from the cross section of the bumper beam 2 in FIG. 2 when the bumper beam 2 is viewed from a side of the bumper beam 2, the bumper beam 2 further comprises an intermediate lower wall portion 2g extending frontward from a lower end of the intermediate front wall portion 2f, a front wall portion 2h extending downward from a front end of the intermediate lower wall portion 2g and a lower wall portion 2i extending rearward from a lower end of the front wall portion 2h, and the intermediate lower wall portion 2g, the front wall portion 2h and the lower wall portion 2i are integrally formed.

As further seen from the cross section of the bumper beam 2 in FIG. 2 when the bumper beam 2 is viewed from a side of the bumper beam 2, the bumper beam 2 further comprises an rear wall portion 2j extending downward from a rear end portion of the lower wall portion 2i and a lower wall portion 2k extending rearward from a lower end of the rear wall portion 2j, and the rear wall portion 2j and the lower wall portion 2k are integrally formed.

Accordingly, there is a recessed portion formed of the intermediate upper wall portion 2e, the intermediate front wall portion 2f and the intermediate lower wall portion 2g on a front face of the bumper beam 2. A pressure generating tube 4, a tube compressing portion 20 of a load transmitting member 6 and a tube retaining member 40, which are to be described later, are disposed on a front side of the recessed portion, which facilitates fitting and separating these members.

<Bumper Face>

The bumper face 3 is disposed frontward of the bumper beam 2 and is a resin made member or a metal made member forming an exterior surface of the vehicle (design face). The bumper face 3 as viewed from its side comprises an upper wall portion 3a extending in the vehicle front-rear direction, a front wall portion 3b extending downward from a front end portion of the upper wall portion 3a and a lower wall portion 3c extending rearward from a lower end portion of the front wall portion 3b. The upper wall portion 3a, the front wall portion 3b and the lower wall portion 3c are integrally formed.

<Pressure Generating Tube>

The pressure generating tube 4 is disposed to extend in the vehicle width direction between the bumper beam 2 and the bumper face 3. The pressure generating tube 4 is a flexible member made of resin and when the pressure generating tube 4 is compressed by a load applied and crushed, an internal fluid (for example, air) in the pressure generating tube 4 generates an increased pressure.

<Pressure Sensor>

As shown in FIG. 1, a pair of right and left pressure sensors 5, 5 are connected with both ends of the pressure generating tube 4. The pressure sensor 5 is configured to detect the pressure generated by the internal fluid through deformation of the crushed pressure generating tube 4 and output a detected result to a control unit (not shown). The control unit performs a control operation of lifting up a hood (bonnet) over an engine room located at a front portion of the vehicle based on the detected results from the pair of right and left pressure sensors 5, 5 to protect a collision object (such as a pedestrian).

<Load Transmitting Member>

The load transmitting member 6 is a resin made member (for example, made of polypropylene) disposed between the bumper beam 2 and the bumper face 3. The load transmitting member 6 is produced, for example, through injection molding and has a sufficiently high stiffness to prevent a delay in detecting a collision. The load transmitting member 6 compresses the pressure generating tube 4 to generate an increased pressure of the internal fluid in the pressure generating tube 4. As shown in FIG. 2, the load transmitting member 6 comprises a rear wall portion 10, a tube compressing portion 20 and a hinge portion 30, which are formed integrally.

<Rear Wall Portion>

Figure 3:
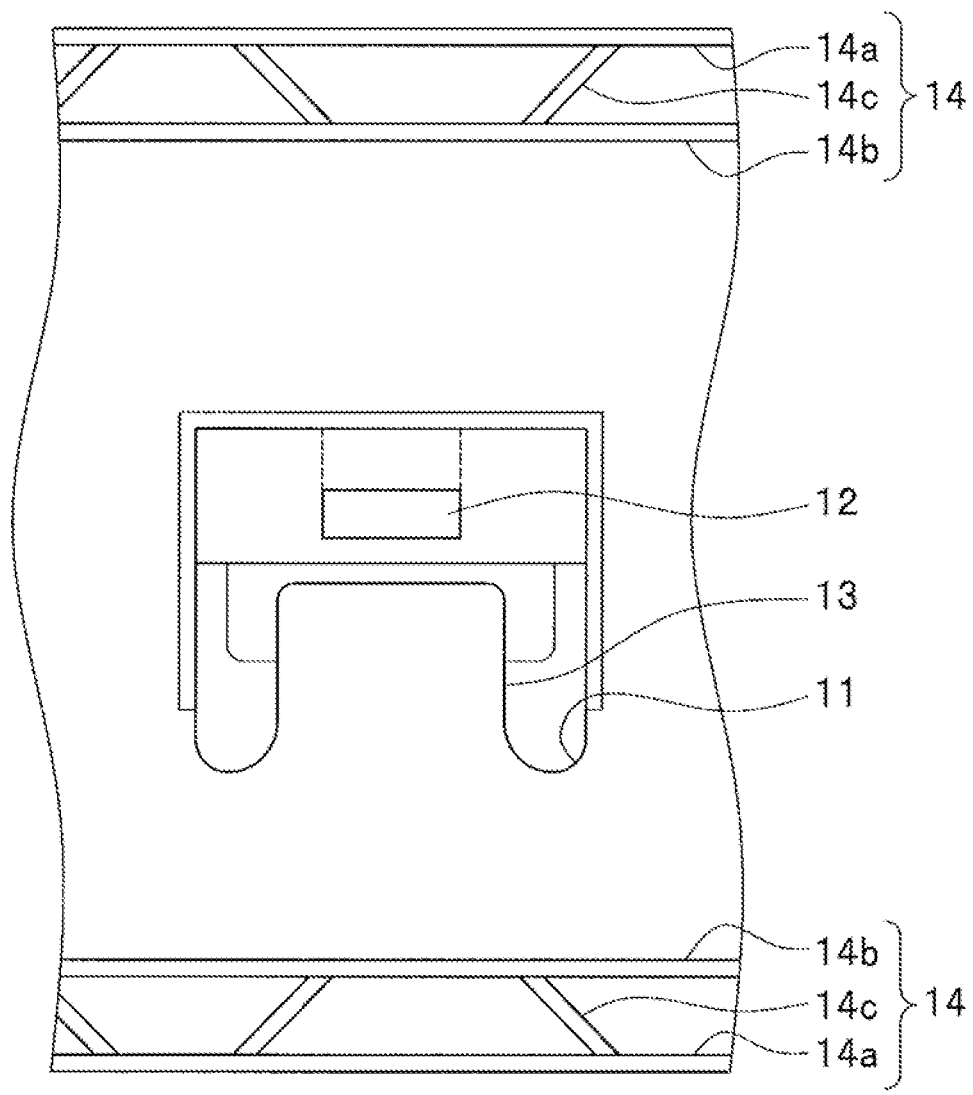
FIG. 3 is a schematic rear elevation view of the collision detecting structure showing a rear wall portion.
Figure 3:
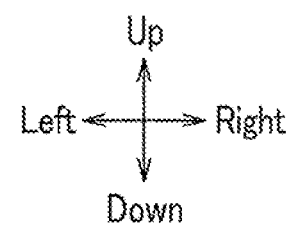

A rear wall portion 10 is disposed on the rear side of the pressure generating tube 4 and is an elongate plate-like member extending in the upper-lower direction and in the right-left direction (that is, extending along a forehead face). As shown in FIG. 3, the rear wall portion 10 includes plural sets of a hole portion 11 in a rectangular shape, a securely engaging portion 12 extending downward from an upper edge of the hole portion 11 and a release preventing portion 13 extending upward from the lower edge of the hole portion 11. These sets are formed and disposed in the vehicle width direction. The securely engaging portion 12 has such a claw-like shape that the securely engaging portion 12 can securely engage with a circumferential edge portion of a hole portion 44a to be described later. The release preventing portion 13 is in such a tongue-like shape that the release preventing portion 13 extends upward from a middle portion of the hole portion 11 with a space left on each side of the release preventing portion 13.

There are a pair of upper and lower flange portions 14, 14 on the rear wall portion 10. The upper flange portion 14 extends rearward from an upper end portion of the rear wall portion 10 and is above the upper wall portion 2c of the bumper beam 2. The lower flange portion 14 extends rearward from a lower end portion of the rear wall portion 10 and is below the lower wall portion 2i of the bumper beam 2. A portion of the rear wall portion 10 where the flange portion 14 forms a large cross section area portion having a larger cross section area than the other portion (that is, general face) where the flange portion 14 is not formed. The large cross section area portions as explained extend continuously in the vehicle width direction.

The flange portion 14 of this embodiment comprises a first wall portion 14a extending rearward from an edge portion of the rear wall portion 10, a second wall portion 14b extending from the rear wall portion 10 facing the first wall portion 14a and plural joining wall portions 14c that are joined to both the first wall portion 14a and the second wall portion 14b. Each of the plural joining wall portions extends diagonally between the first wall portion 14a and the second wall portion 14b. Each of the plural joining wall portions 14c is in parallel with a joining wall portion 14c located across a next joining wall portion 14c. A pair of every adjacent joining wall portions 14c are line-symmetric with each other.

Figure 5:
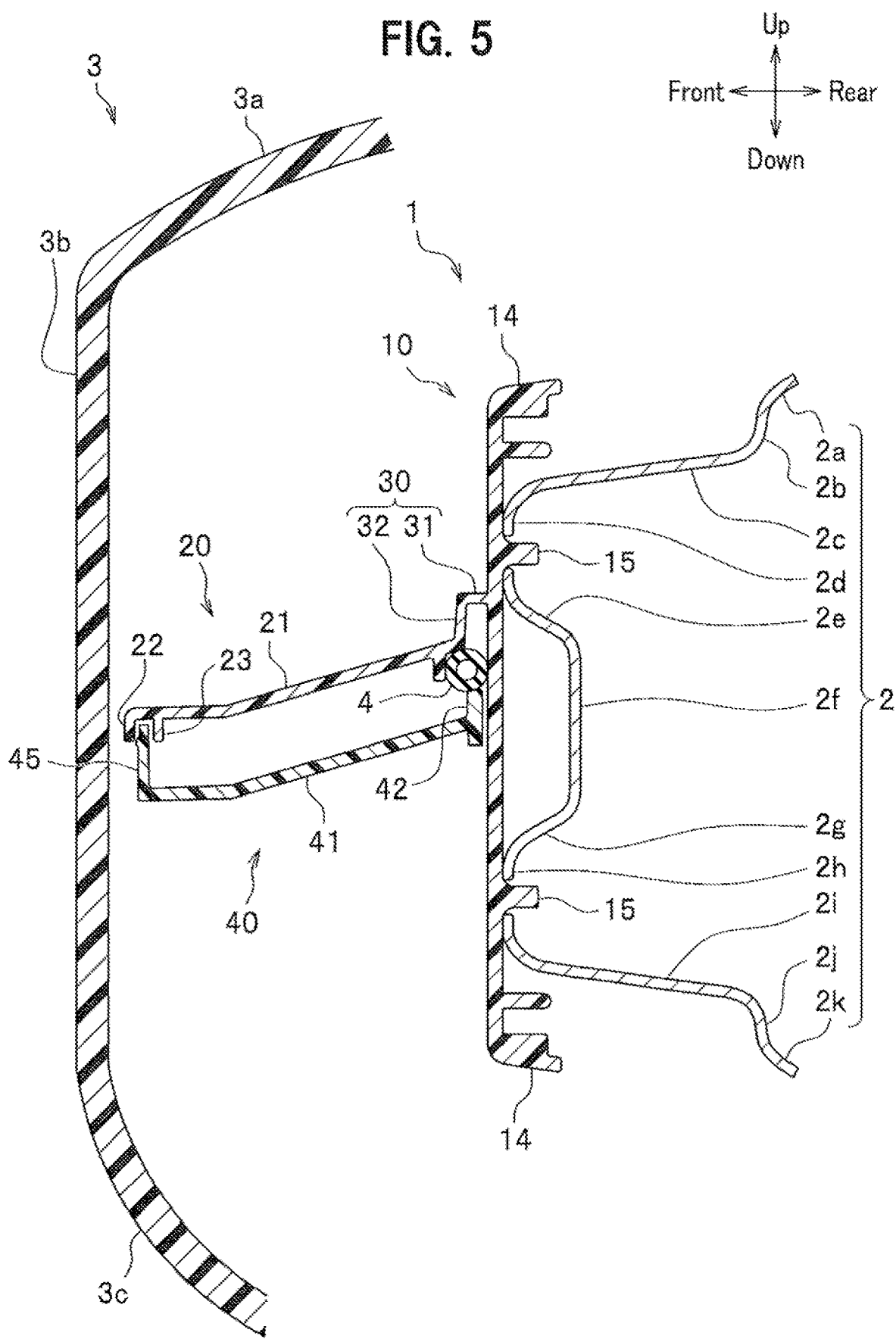
FIG. 5 is a schematic cross-sectional view of the collision detecting structure as shown in FIG. 1 through the line V-V.
Figure 6:
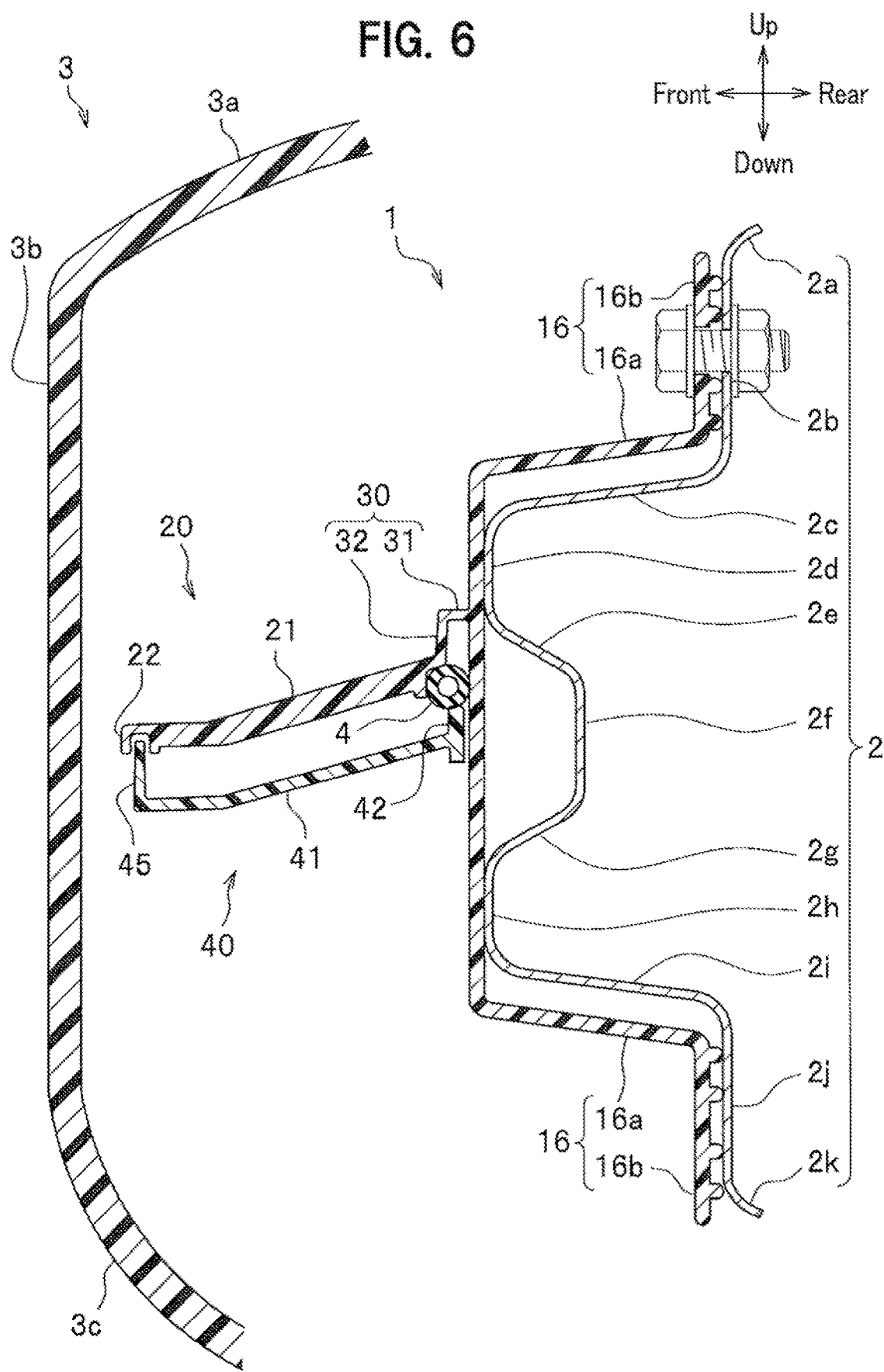
FIG. 6 is a schematic cross-sectional view of the collision detecting structure as shown in FIG. 1 through the line VI-VI.

The rear wall portion 10 is fixed to the front wall portions 2d, 2h with bosses that formed to protrude rearward from the rear wall portion 10 (See FIG. 5). These bosses are disposed inward in the vehicle width direction from a pair of right and left securely engaging portions 16, 16 to be described later (See FIG. 1 and FIG. 6).

<Tube Compressing Portion>

As shown in FIG. 2, the tube compressing portion 20 is disposed frontward of the pressure generating tube 4 and is a portion that does not compress the pressure generating tube 4 when the vehicle is running ordinarily and compresses the pressure generating tube 4 in cooperation with the rear wall portion 10 when the vehicle is in collision (head-on collision). The tube compressing portion 20 comprises an projecting wall portion 21 extending in the vehicle front-rear direction, a front wall portion 22 extending downward from a front end of the projecting wall portion 21, an opposite wall portion 23 extending downward from a vicinity of the front end of the projecting wall portion 21 facing the front wall portion 22 and a compressing wall portion 24 extending downward from a vicinity of a rear end portion of the projecting wall portion 21. The projecting wall portion 21, the front wall portion 22, the opposite wall portion 23 and the compressing wall portion 24 are integrally formed.

The projecting wall portion 21 of the present embodiment is an elongate plate-like member extending frontward inclining downward. Accordingly, the front-end portion (tip portion) of the projecting wall portion 21 is disposed lower than a rear end portion (base end portion) of the projecting wall portion 21. In other words, the tip portion of the projecting wall portion 21 is offset in the upper-lower direction toward a lower side of the projecting wall portion 21 where the pressure generating tube 4 is relative to the base end portion of the projecting wall portion 21. In addition, the projecting wall portion 21 is formed to curve in such a way that the projecting wall portion 21 is in a downward convex shape when viewed from its side.

The front wall portion 22 has a hole portion 22a formed therethrough. The hole portion 22a has a circumferential portion with which a securely engaging portion 45 of the tube retaining member 40 to be described later securely engages. A length (dimension in the upper-lower direction) of the opposite wall portion 23 is shorter than that of the front wall portion 22. The opposite wall portion 23 abuts the securely engaging portion 45 of the tube retaining member 40 to be described later. The compressing wall portion 24 is formed to be spaced apart from the rear wall portion 10 by an outer diameter (diameter) of the pressure generating tube 4.

<Hinge Portion>

A hinge portion 30 is disposed over the pressure generating tube 4 and joins the rear end portion (base end portion) of the projecting wall portion 21 of the tube compressing portion 20 to the rear wall portion 10 in a manner that the projecting wall portion 21 can pivot relative to the rear wall 10. The hinge portion 30 comprises an upper wall portion (first wall portion) 31 extending frontward from the rear wall portion 10 and a front wall portion (second wall portion) 32 extending downward from a front end of the upper wall portion 31. The first wall portion 31 and the second wall portion 32 are integrally formed. A lower end of the front wall portion 32 is joined to the rear end portion of the projecting wall portion 21 of the tube compressing portion 20.

<Tube Retaining Member>

A tube retaining member 40 is disposed opposite to the projecting wall portion 21 of the tube compressing portion 20 and is a resin made member (for example, made of polypropylene) to retain the pressure generating tube 4 in cooperation with the projecting wall portion 21. The tube retaining member 40 is produced, for example, through injection molding and has a sufficiently high stiffness to prevent delay in detecting a collision, as is the case with the tube compressing portion 20. The tube retaining member 40 comprises an projecting wall portion 41 extending in the vehicle front-rear direction, an intermediate piece portion 42 extending downward from a rear end of the projecting wall portion 41, a lower piece portion 43 extending rearward from a lower end of the intermediate piece portion 42, a rear piece portion 44 extending upward from a rear end of the lower piece portion 43 and a securely engaging portion 45 extending upward from a front end of the projecting wall portion 41. The projecting wall portion 41, the intermediate piece portion 42, the lower piece portion 43, the rear piece portion 44 and the securely engaging portion 45 are integrally formed.

The intermediate piece portion 42 and the lower piece portion 43 function as a hinge for the projecting wall portion 41 in the same way as the hinge portion 30 does. The rear piece portion 44 has a hole portion 44a in a rectangular shape formed therethrough. The securely engaging portion 12 of the rear wall portion 10 is configured to securely engage with a circumferential edge portion of the hole portion 44a. That is, the tube retaining member 40 securely engages with a rear side portion of the rear wall portion 10. The securely engaging portion 45 has such a claw-like shape as can securely engage with a circumferential edge of the hole portion 22a.

<Fitting Tube Retaining Member to Load Transmitting Member>

An operator fits the tube retaining member 40 to the load transmitting member 6 with the pressure generating tube 4 disposed between the rear wall portion 10 of the load transmitting member 6 and the compressing wall portion 24. During this operation, the operator puts the rear piece portion 44 of the tube retaining member 40 into the hole portion 11 from frontward and securely engages the securely engaging portion 12 of the rear wall portion 10 with the hole portion 44a of the rear piece portion 40. Similarly, the operator securely fits the securely engaging portion 45 into the hole portion 22a of the front wall portion 22 while pressing the securely engaging portion 45 against the opposite wall portion 23.

When the rear piece portion 44 is put through the hole portion 11, the release preventing portion 13 elastically deforms to displace rearward, which enables the rear piece portion 44 being put through the hole portion 11. After the securely engaging portion 12 is securely fitted into the hole portion 44a, the release preventing portion 13 functions for preventing the rear piece portion 44 from coming off from the rear wall portion 10.

<Compressing Pressure Generating Tube on Vehicle Colliding>

Figure 4:
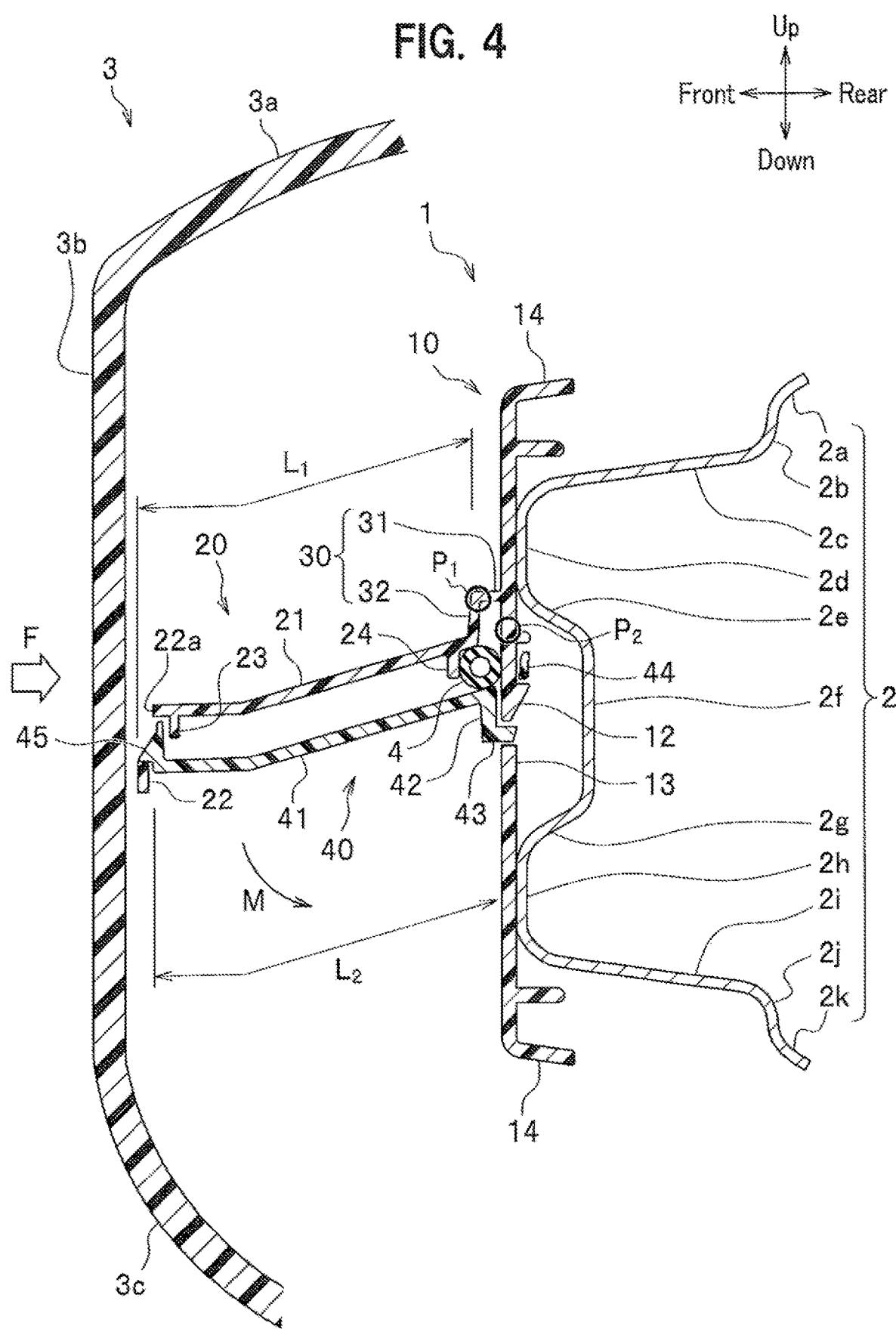
FIG. 4 is a schematic cross-sectional view of the collision detecting structure as shown in FIG. 1 through the line IV-IV.

As shown in FIG. 4, when a vehicle is in collision (head-on collision), a head-on collision load F is applied to the projecting wall portion 21 of the tube compressing portion 20 to generate a moment M to act on the projecting wall portion 21 to pivot on the hinge portion 30 (especially a point $P_1$ corresponding to a joint portion between the upper wall portion 31 and the front wall portion 32) to turn downward. Similarly, the head-on collision load F is applied to the projecting wall portion 41 of the tube retaining member 40 to generate the moment M to pivot on the base end portion of the projecting wall portion 41 (a joint portion between the projecting wall portion 41 and the intermediate piece portion 42) to turn downward. Due to the moment M, the compressing wall portion 24 of the tube compressing portion 20 is displaced to press the pressure generating tube 4 rearward against the rear wall portion 10 and crush the pressure generating tube 4 to be compressed.

In this configuration, a front-rear direction length $L_2$ of the projecting wall portion 41 of the tube retaining portion 40 is made longer than a front-rear direction length $L_1$ of the projecting wall portion 21 of the tube compressing portion 20. The point $P_1$ corresponding to a joint position between the upper wall portion 31 and the front wall portion 32 is a pivot centre on which the projecting wall portion 21 pivots and the joint position between the projecting wall portion 41 and the intermediate piece portion 42 is a pivot centre on which the projecting wall portion 41 pivots. The pivot centre of the projecting wall portion 41 is positioned right under the tube 4 and rearward of the pivot axis of the projecting wall portion 21. As a result, when both the projecting wall portions 21, 41 turn downward, the front ends of the projecting wall portions 21, 41 come closer to each other, which enables preventing the projecting wall portions 21, 41 that securely engage with each other from coming off from each other.

As shown in FIG. 1, the rear wall portion 10 includes four fixing portions 16 formed thereon. Each of the fixing portions 16 is a flange portion at which the rear wall portion 10 is bolted to the bumper beam 2 and comprises a first wall portion 16a extending rearward from either of upper and lower edge of the rear wall portion 10 and a second wall portion 16b extending outward in the upper-lower direction from a rear end portion of the first wall portion 16a. The first wall portion 16a and the second wall portion 16b are integrally formed.

Four fixing portions 16 are attached on upper and lower portions on the right side of the rear wall portion 10 in the vehicle width direction and on upper- and lower portions of the left side of the rear wall portion 10 in the vehicle width direction. The second wall portion 16b of the fixing portion 16 on the left upper-edge of the rear wall portion 10 is bolted to the rear end portion 2b of the bumper beam 2 while the second wall portion 16b of the fixing portion 16 on the left lower-edge of the rear wall 10 is bolted to the rear wall portion 2j of the bumper beam 2 (See FIG. 6). Similarly, the second wall portion 16b of the fixing portions 16 on the right upper-edge of the rear wall 10 is bolted to the rear wall portion 2b of the bumper beam 2 while the second wall portion 16b of the fixing portion 16 on the right lower-edge is bolted to the rear wall portion 2j of the bumper beam 2.

The rear wall portion 10 has portions 10B that are located outward in the vehicle width direction of a left outermost lower fixing portion 16 in the vehicle width direction and a right outermost lower fixing portion 16 in the vehicle width direction (that is, over-hang portions of the rear wall portion 10), and a portion 10A inward in the vehicle width direction of the left outermost lower fixing portion 16 and the right outermost lower fixing portion 16 (that is, a portion between the left outermost lower fixing portion 16 and the right outermost lower fixing portion 16 and including the left outermost lower fixing portion 16 and the right outermost lower fixing portion 16 in the vehicle width direction in the present embodiment). A stiffness of the portions 10B is set lower than that of the portion 10A. The stiffness means a stiffness in the vehicle front-rear direction, that is, a stiffness against the head-on collision load F. The stiffnesses of the portions 10A, 10B are set, for example, according to the following examples.

Figure 9:
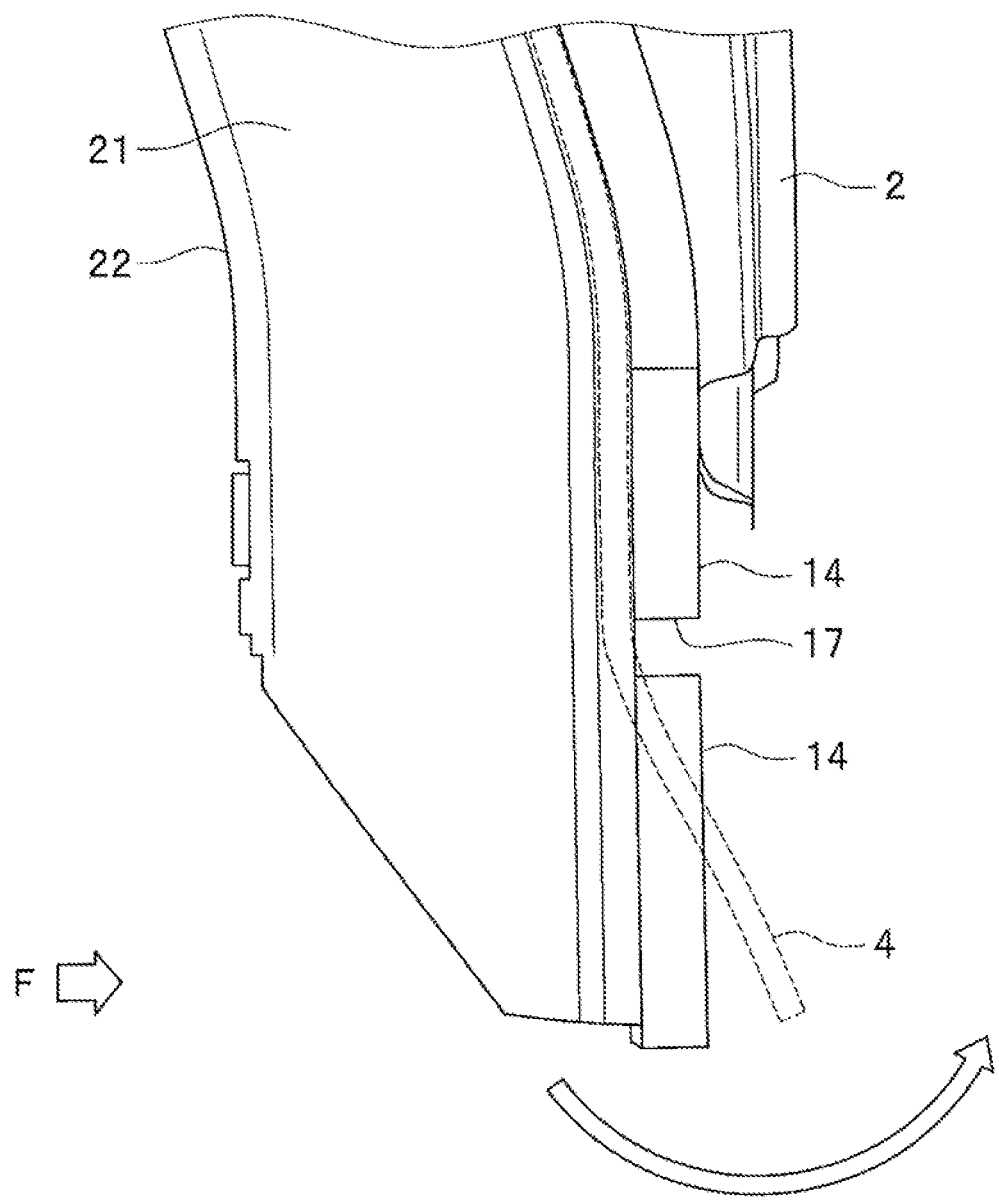
FIG. 9 is a schematic plan view of an end portion in a vehicle width direction of the collision detecting structure of the embodiment of the present invention.
Figure 9:
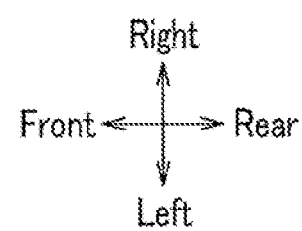

Different materials having different material properties are used between the portions 10A, 10B. The material properties indicate kind of material, coefficient of elasticity, yield strength and hardness that depend on material's composition. The rear wall portion 10 of different materials can be produced, for example, by two color molding The portions 10A, 10B are made to have different cross section areas. The cross section area of the portion 10B when it is viewed from a side is made smaller than that of the portion 10A. The rear wall portion 10 as described above can be made by removing a portion of the flange portion 14 or the entire flange portion 14 of the portion 10B. As shown in FIG. 9, the portion 10B of the rear wall portion 10 has the flange portion 14 that has a cut-out portion 17 in such a shape as opens rearward.

When the head-on collision load F is applied to a portion of the load transmitting member 6 outward in the vehicle width direction of the cut-out portion 17 on the vehicle colliding (head-on collision), the rear wall portion 10 bends at the cut-out portion 17. That is, since the rear wall portion 10 bends to have its portion outward in the vehicle width direction of the cut-out portion 17 displace rearward (indicated by dotted lines in FIG. 9), the pressure generating tube 4 is compressed at the bent portion to generate an increased pressure of the internal fluid.

In order to prevent the rear wall portion 10 from hitting the bumper beam 2, the cut-out portion 17 may be formed on a portion 10C of the rear wall portion 10 that is formed outward in the vehicle width direction of a vehicle width direction end portion of the bumper beam 2. The projecting wall portions 21, 41 on the portion 10C taper toward outer ends of the projecting wall portions 21, 41 in the vehicle width direction so that the front end portions of the projecting wall portions 21, 41 incline rearward as they extend toward the outer ends.

Figure 10:
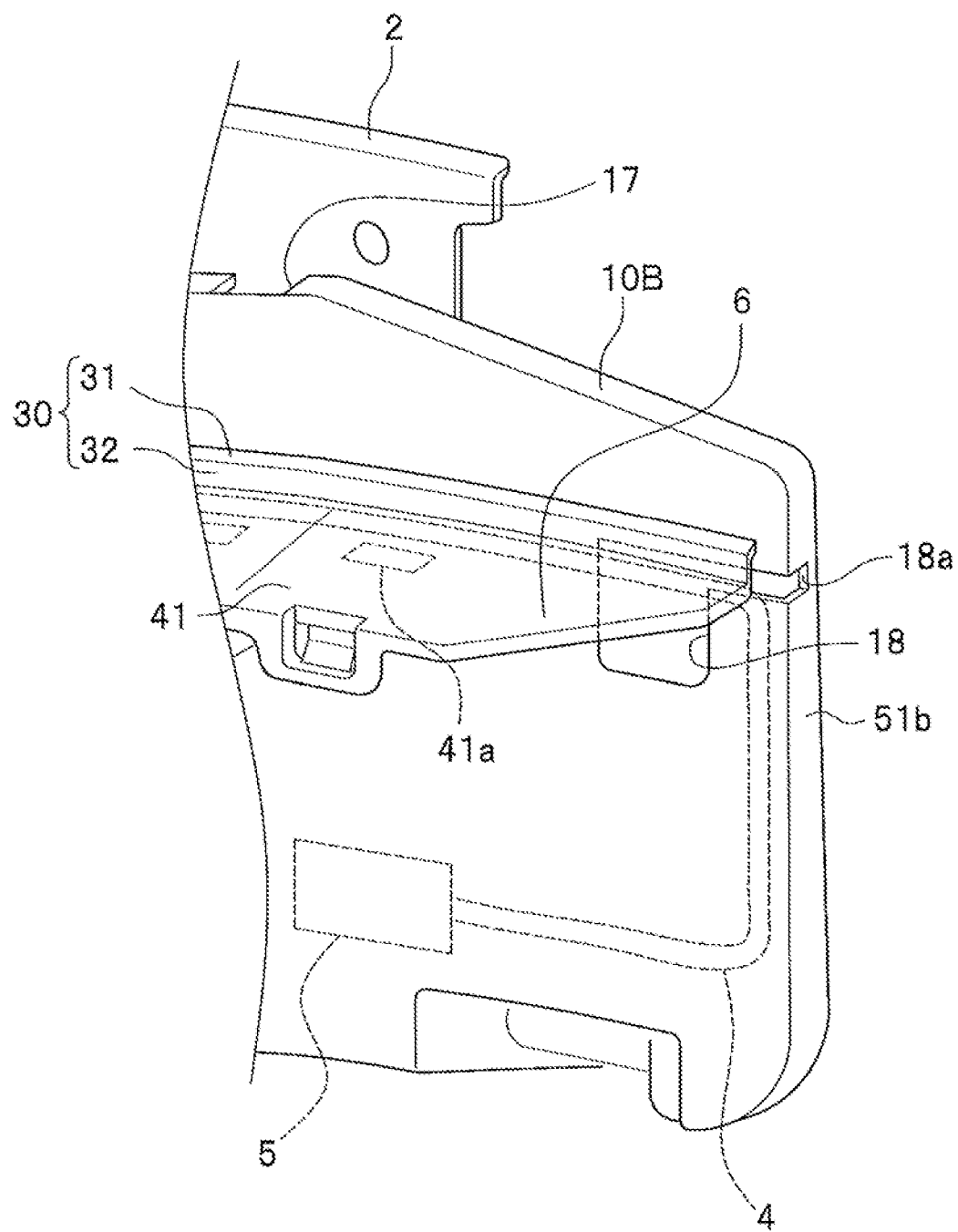
FIG. 10 is a schematic perspective view of an example of the end portion in the vehicle width direction of the collision detecting structure of the embodiment of the present invention.

As shown in FIG. 10, a hole portion (or cut-out portion) 18 is formed on the portion 10B of the rear wall portion 10 in the vicinity of the base end portion of the hinge portion 30. The hole portion 18 is intended to bring the pressure generating tube 4 through the rear wall portion 10 over to a rear side of the rear wall portion 10. In this example, the hole portion 18 is formed integrally with the cut-out portion 18a. The cut-out portion 18a has an inner end portion in the vehicle width direction in communication with the hole portion 18 and an outer end portion in the vehicle width direction opening outside at an outer end portion of the portion 10B of the rear wall portion 10. In this example, the cut-out portion 18a is formed on a front portion of a side flange wall portion 51b, and an upper portion and a lower portion of the side flange wall portion 51b, between which the cut-out portion 18a is disposed, are joined through a portion on a rear side of the cut-out portion 18a. Both the hole portion 18 and the cut-out portion 18a function to lower the stiffness of the portion 10B of the rear wall portion 10 close to a stiffness of the hinge portion 30.

Figure 11:
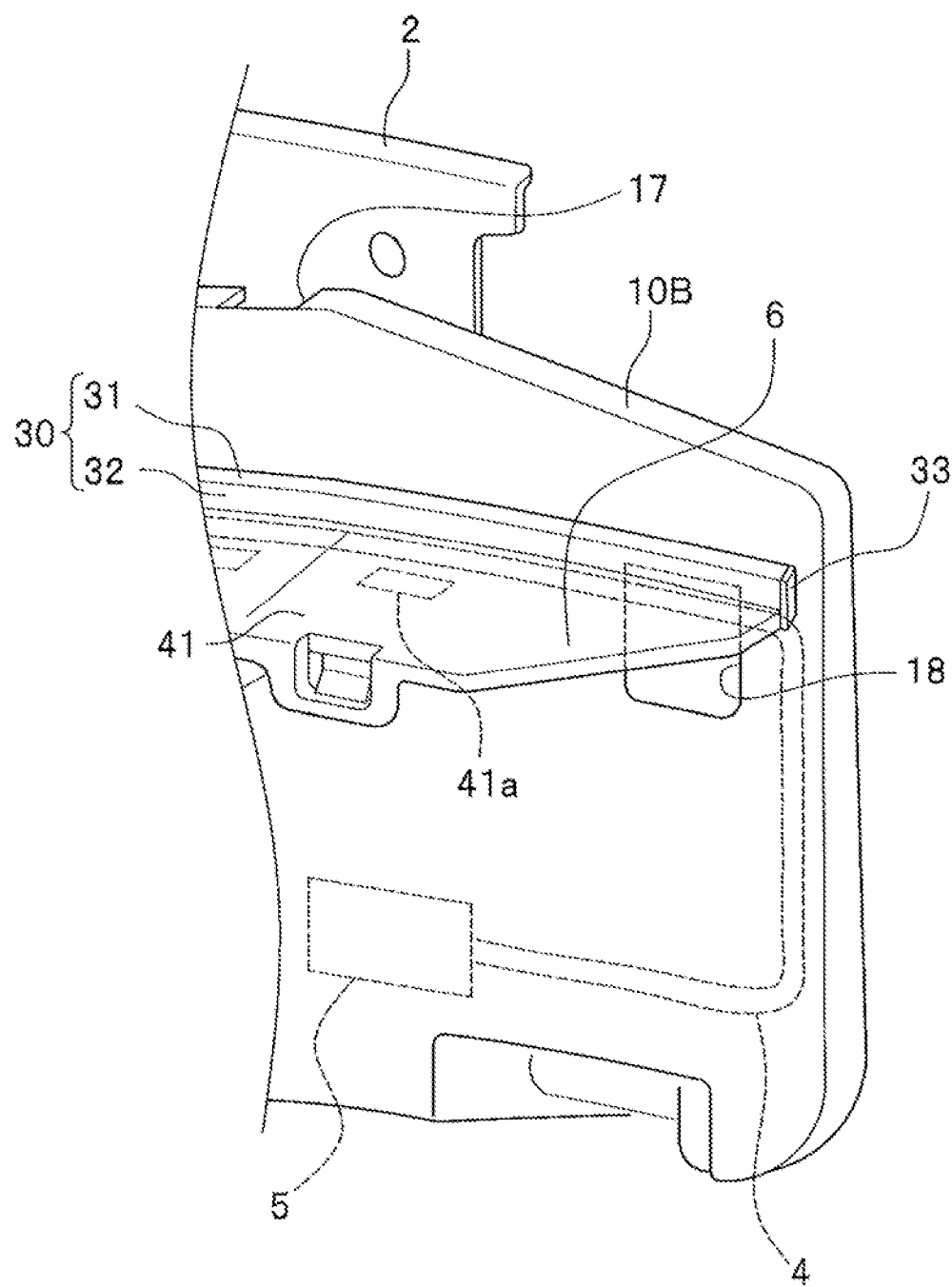
FIG. 11 is a schematic perspective view of an example of the end portion in the vehicle width direction of the collision detecting structure of the embodiment of the present invention.

In other example as shown in FIG. 11, a wall portion (third wall portion) 33 is formed at each end portion of the hinge portion 30 in the vehicle width direction. The wall portion 33 is formed at each end portion of the hinge portion 30 and is configured to join the rear wall portion 10 to the upper wall portion 31 and the lower wall portion 32 of the hinge portion 30. That is, the third wall portion 33 closes a gap formed between the outer end portion of the hinge portion 30 and the rear wall portion 10. In this example, a cut-out portion 18a is not formed on the portion 10B of the rear wall portion 10. Such examples as to have no cut-out portion 18a formed therein are illustrated in figures other than FIG. 11, especially in FIGS. 12 to 16.

Figure 7:
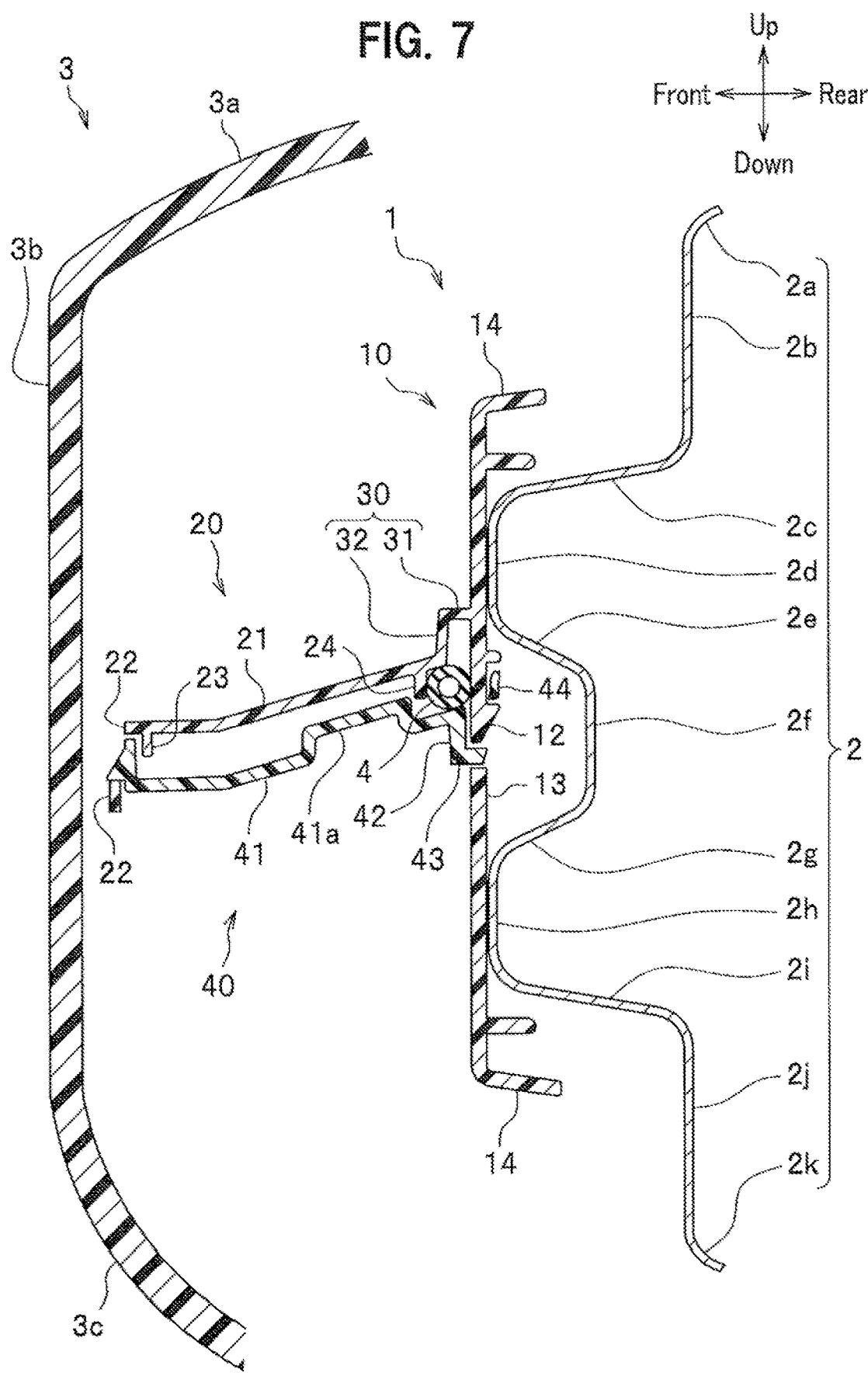
FIG. 7 is a schematic cross-sectional view of the collision detecting structure as shown in FIG. 1 through the line VII-VII.

As shown in FIG. 7, the projecting wall portion 41 of the tube retaining member 40 includes a tube fitting error prevention portion 41a formed frontward of the compressing wall portion 24 of the tube compressing portion 20. The tube fitting error prevention portion 41a is such an upward protruding portion that a distance from the tube fitting error prevention portion 41a to the projecting wall portion 21 is smaller than a diameter of the pressure generating tube 4. The tube fitting error prevention portion 41a is intended to prevent, what is called, an erroneous fitting, that is, to prevent the pressure generating tube 4 from being disposed at a different position from a predetermined position (a right position: a position rearward of the tube fitting error prevention portion 41a and surrounded by the rear wall portion 10, the projecting wall portion 21, the compressing wall portion 24 and the projecting wall portion 41). When the pressure generating tube 4, the load transmitting member 6 and the tube retaining member 40 are fitted to this structure as described above, an operator does not fail to feel a counter force from the pressure generating tube 4 if the pressure generating tube 4 is put to a position other than the position between the rear wall portion 10 and the compressing wall portion 24.

In addition, the tube fitting error prevention portions 41a are disposed respectively at the corresponding positions in the vehicle width direction to the securely engaging positions where the tube retaining member 40 securely engages with the rear wall portion 10, that is, the positions respectively frontward of the securely engaging position (their heights may vary).

Figure 8:
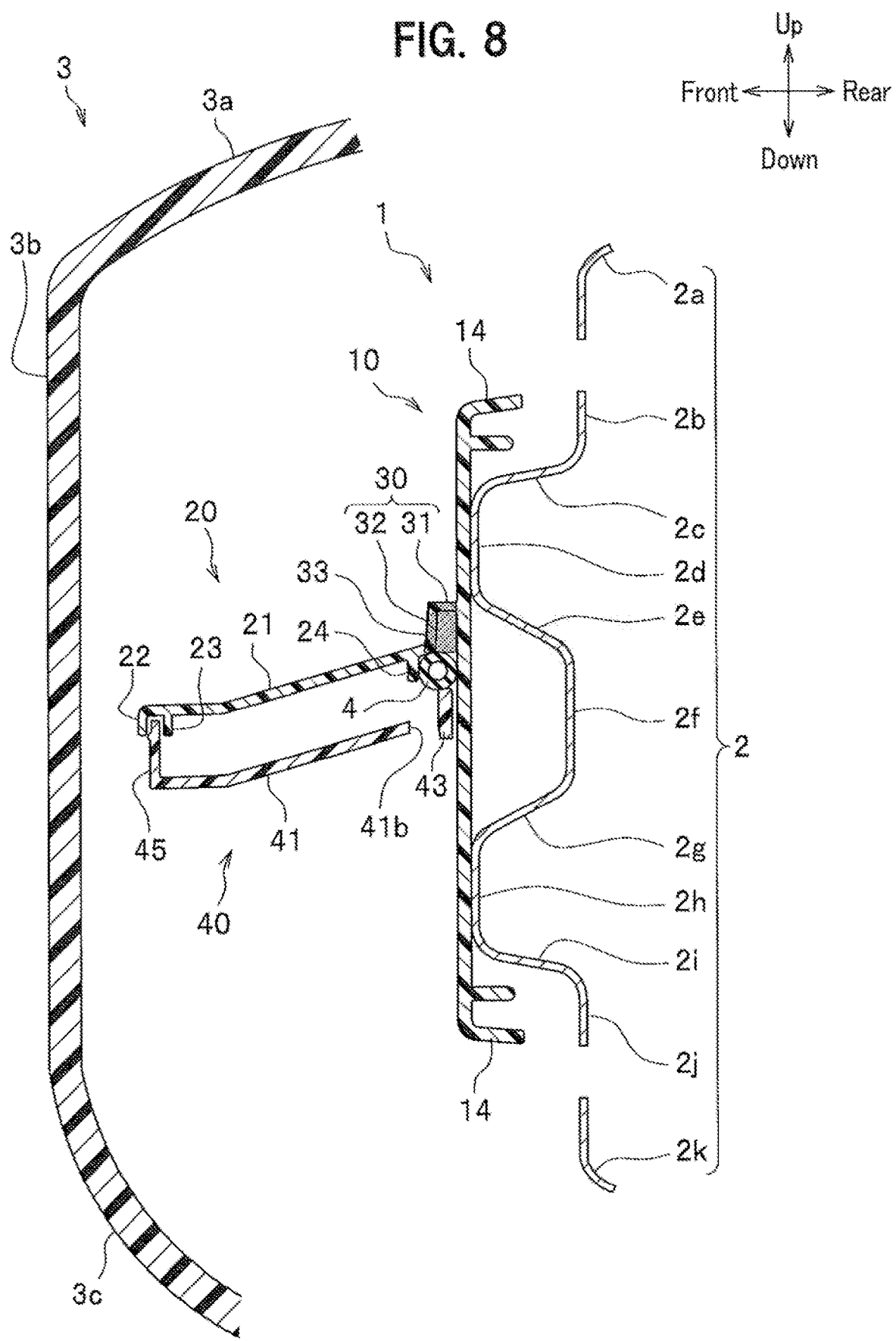
FIG. 8 is a schematic cross-sectional view of the collision detecting structure as shown in FIG. 1 through the line VIII-VIII.

As shown in FIG. 8, a tube portion checking portion 41b is formed at a rear end portion of the projecting wall portion 41 of the tube retaining member 40. The tube position checking portion 41b is a hole portion through which an operator looks at the pressure generating tube 4 and checks that the pressure generating tube is disposed at an appropriate position.

As shown in FIG. 1, the tube fitting error prevention portions 41a and the tube position checking portions 41b are alternately disposed in the vehicle width direction. The collision detecting structure 1 may include a tube fitting error prevention portion 21a as shown in FIG. 2 instead of the tube fitting error prevention portion 41a. The tube fitting error prevention portion 21a is such a downward protruding portion extending downward from the projecting wall portion 21 frontward of the compressing wall portion 24 that a distance between the tube fitting error prevention portion 21a and the projecting wall portion 41 is smaller than the outer diameter (diameter) of the tube 4.

Figure 12:
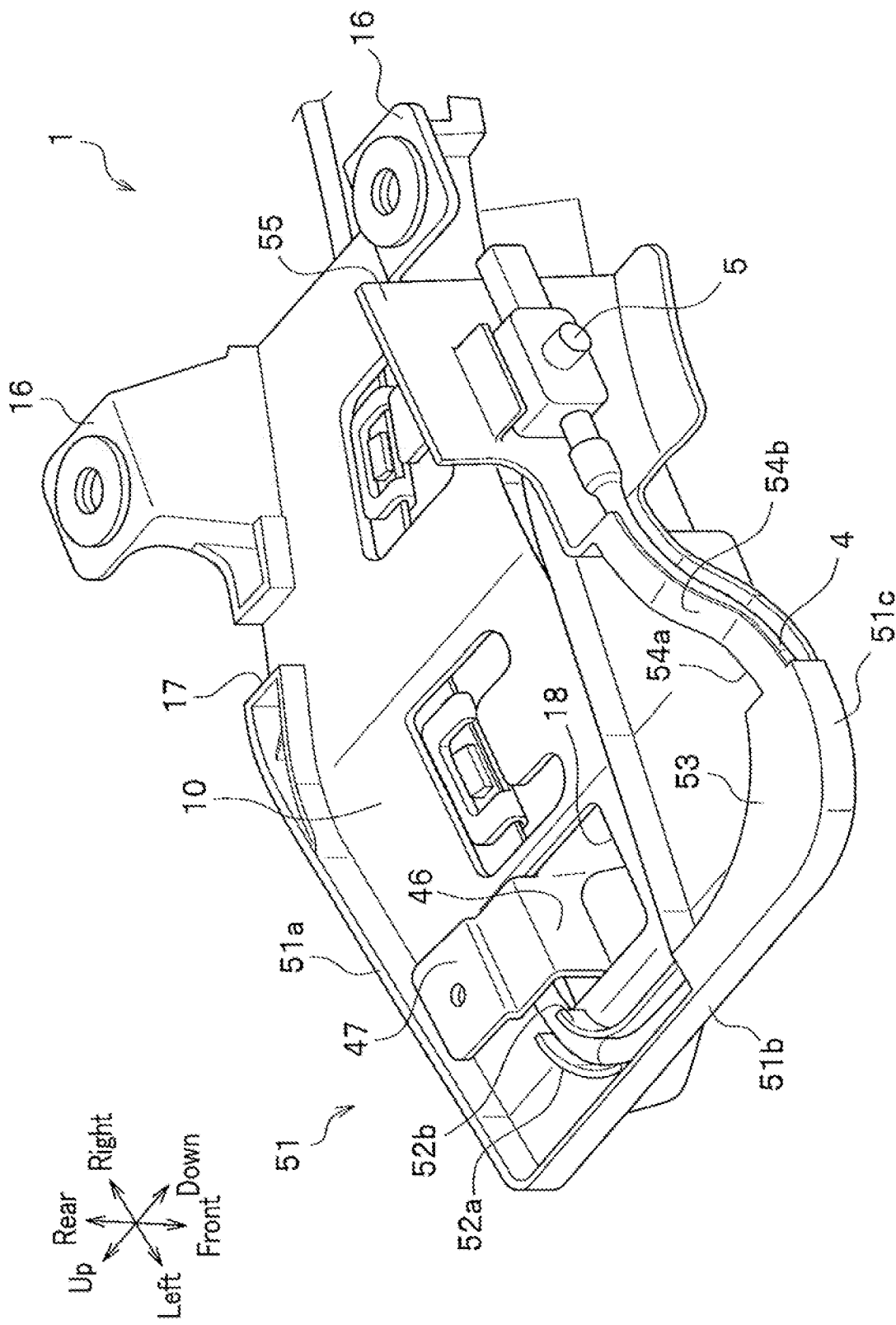
FIG. 12 is a schematic perspective view of an end portion in the vehicle width direction of the rear wall portion.
Figure 13:
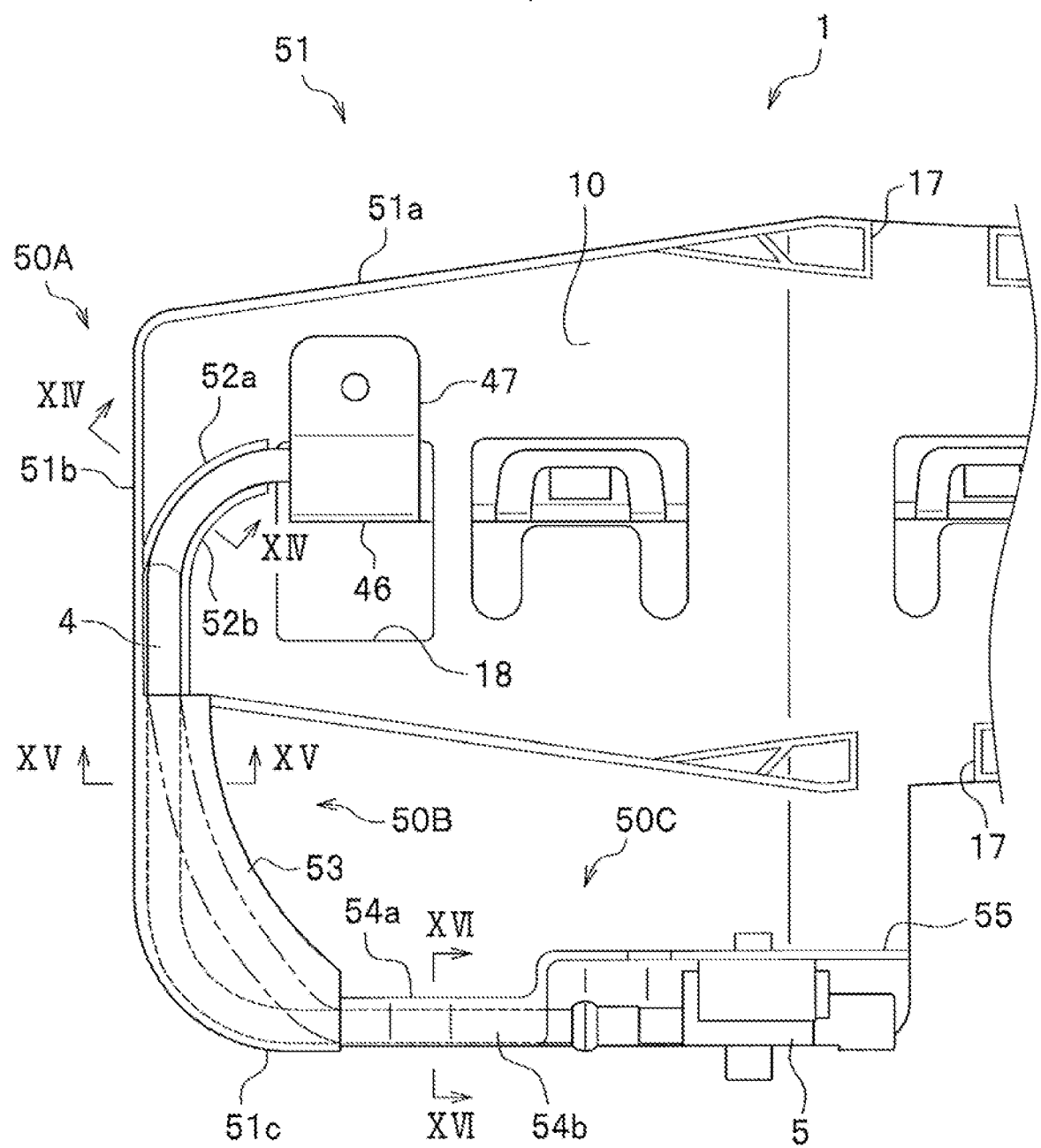
FIG. 13 is a schematic rear elevation view of an end portion in the vehicle width direction of the rear wall portion.
Figure 13:
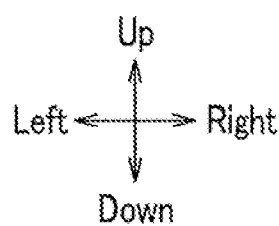

As shown in FIG. 12 and FIG. 13, a vehicle width direction end portion of the rear wall portion 10 includes a circumferential edge flange wall portion 51, a pair of groove side wall portions 52a, 52b, a groove side wall portion 53, a groove bottom wall portion 54a, a groove side wall portion 54b and an attachment wall portion 55.

The circumferential edge flange wall portion 51 is a wall portion extending rearward from a circumferential edge portion of the rear wall portion 10. The circumferential edge flange wall portion 51 comprises an upper circumferential flange wall portion 51a that extends rearward from an upper edge portion and is continuously joined to the first wall portion 14a of the flange portion 14, a side flange portion 51b extending rearward from a side edge portion in the vehicle width direction and a lower flange wall portion 51c extending rearward from a lower edge portion. The upper flange wall portion 51a, the side flange portion 51b and the lower flange wall portion 51c are integrally formed. The lower flange wall portion 51c is not formed on a circumferential edge portion of a groove bottom wall portion 54a and a groove side wall portion 54b, which are to be described later.

The groove side wall portion 52a extends outward in the vehicle width direction from the vehicle width direction outer edge portion of the hole portion 18, further extends curving downward and is joined to the side flange portion 51b. The groove side wall portion 52b extends outward in the vehicle width direction from the vehicle width direction outer edge portion of the hole portion 18, further extends curving downward and is disposed opposite to the groove side wall portion 52a and the side flange wall portion 51b. The groove side wall portion 52a, a part of the side flange wall portion 51b, the groove side wall portion 52b and a portion of the rear wall portion 10 corresponding these portions constitute a first tube receiving portion 50A that is in a groove-like shape and has a bottom wall portion of the portion of the rear wall portion 10.

The groove side wall portion 53 extends inward in the vehicle width direction from a rear edge portion of the side flange wall portion 51b and upward from a rear edge portion of the lower flange wall portion 51c. The side flange wall portion 51b, the lower flange wall portion 51c, the groove side wall portion 53 and a portion of the rear wall portion 10 corresponding to theses portions constitute a second tube receiving portion 50B that is in a groove-like shape and has a bottom wall portion formed of the side flange wall portion 51b and the lower flange wall portion 51c.

The groove bottom wall portion 54a extends rearward from the vicinity of a lower circumferential portion of the rear wall portion 10. The groove side wall portion 54b extends downward from a rear edge portion of the groove bottom wall portion 54a. The groove bottom wall portion 54a, the groove side wall portion 54b and a portion of the rear wall portion 10 corresponding to these portions constitute a second tube receiving portion 50C that is in a groove-like shape and has a bottom wall portion formed of the groove bottom wall portion 54a. The groove side wall portion 54b in the present embodiment is joined continuously to the groove side wall portion 53.

The attachment wall portion 55 is disposed inward in the vehicle width direction of the groove bottom wall portion 54a and the groove side wall portion 54b, extends rearward from the rear wall portion 10 and is joined to the groove bottom wall portion 54a and the groove side wall portion 54b. The pressure sensor 5 is mounted on a lower face of the attachment wall portion 55.

The pressure generating tube 4 is mounted on a back side face of the rear wall portion 10 to extend to form a U-letter shape opening toward a centre of the rear wall portion 10 in the vehicle width direction. The pressure sensor 5 in the present embodiment is mounted at a position on the rear wall portion 10 outward in the vehicle width direction of the cut-out portion 17 on the rear wall portion 10. Thus, compared with a structure in which the pressure sensor 5 is mounted at a position inward in the vehicle width direction of the cut-out portion 17, the collision detecting structure 1 is configured to prevent a portion of the pressure generating tube 4 in the vicinity of the pressure sensor 5 from crushing unnecessarily when the rear wall portion 10 deforms to bend at the cut-out portion 17.

Figure 14:
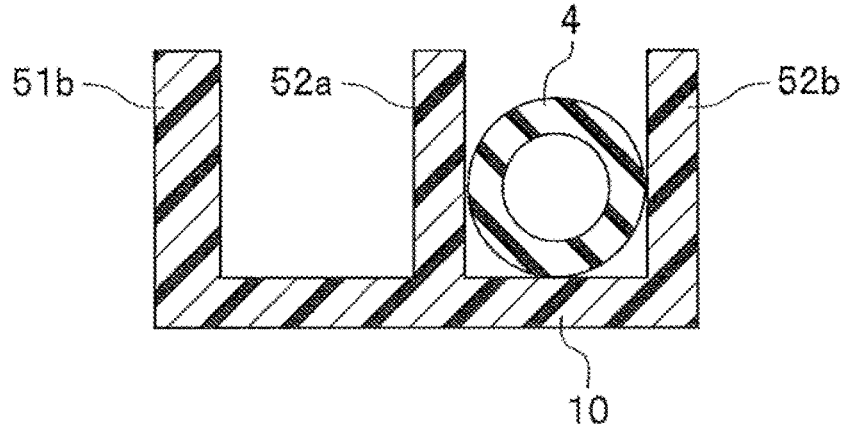
FIG. 14 is a schematic cross-sectional view of the end portion in the vehicle width direction as shown in FIG. 13 through the line XIV-XIV.
Figure 14:
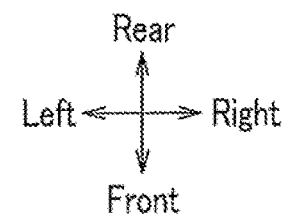

As shown in FIG. 14, the pressure generating tube 4 has a back side portion which extends in the vehicle width direction on the back side of the rear wall portion 10 from a front side portion of the pressure generating tube 4 extending out of the hole portion 18 to the back side of the rear wall portion 10 and further extends curving downward. This back side portion of the pressure generating tube 4 is received in a first tube receiving portion 50A. The first tube receiving portion 50A is a groove portion where the portion of the pressure generating tube 4 is received in such a manner that the portion of the pressure generating tube 4 is allowed to move rearward. A depth of the groove portion of the first tube receiving portion 50A is larger than the outer diameter (diameter) of the pressure generating tube 4. Accordingly, heights of the groove side wall portions 52a, 52b and the side flange wall portion that extend vertically from the rear wall portion 10 are larger than the outer diameter (diameter) of the pressure generating tube 4. The pressure generating tube 4 is received in the first tube receiving portion 50A preferably in such a manner that the pressure generating tube 4 abuts both the rear wall portion 10 and the groove side wall portion 52b (abuts two faces) and more preferably in such a manner that the pressure generating tube 4 further abuts at least one of the groove side wall portion 52a and the side flange portion 51b as well (abuts three faces).

Figure 15:
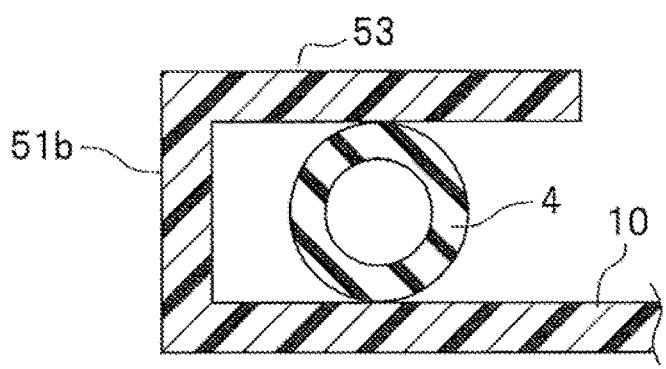
FIG. 15 is a schematic cross-sectional view of the end portion in the vehicle width direction as shown in FIG. 13 through the line XV-XV.
Figure 15:
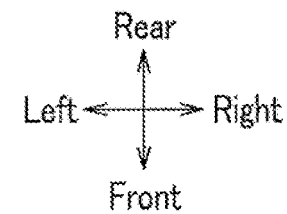

As shown in FIG. 15, there is a portion of the pressure generating tube 4 disposed to extend downward from the first tube receiving portion 50A and further extend curving inward in the vehicle width direction. This portion of the pressure generating tube 4 is received in the second tube receiving portion 50B. The second tube receiving portion 50B is a groove portion where the portion of the pressure generating tube 4 is received in such a manner that the portion of the pressure generating tube 4 is allowed to move in a direction along the back face of the rear wall portion 10 (inward in the vehicle width direction and upward). A depth of the second tube receiving portion 50B is larger than the outer diameter (diameter) of the pressure generating tube 4. Accordingly, a height of the groove side wall portion 53 extending vertically from the side flange wall portion 51b is larger than the outer diameter (diameter) of the pressure generating tube 4. The pressure generating tube 4 is received in the second tube receiving portion 50B preferably in such a manner that the pressure generating tube 4 abuts both the rear wall portion 10 and the groove side wall portion 53 (abuts two faces) in the tube receiving portion 50B.

The second tube receiving portion 50B is especially a portion out of the tube receiving portions 50A, 50B, 50C to absorb length variation of the pressure generating tube 4. For example, when the pressure generating tube 4 is relatively short, the pressure generating tube 4 is disposed apart from the side flange wall portion 51b and the lower flange wall portion 51c in the second tube receiving portion 50B (See dashed and double-dotted lines).

Figure 16:
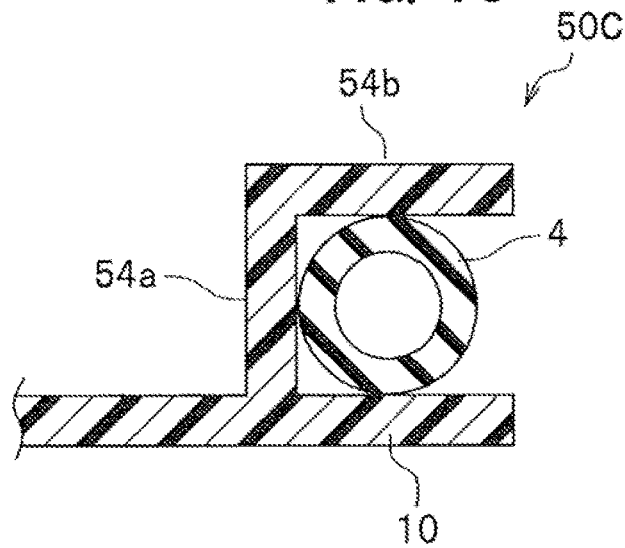
FIG. 16 is a schematic cross-sectional view of the end portion in the vehicle width direction as shown in FIG. 13 through the line XVI-XVI.
Figure 16:
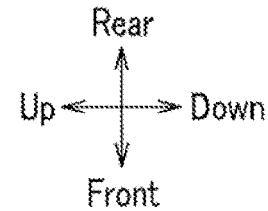

As shown in FIG. 16, a portion of the pressure generating tube 4, which is disposed to extend out of the second tube receiving portion 50B and further inward in the vehicle width direction, is received in the second tube receiving portion 50C. The second tube receiving portion 50C is a groove portion where the portion of the pressure generating tube 4 is received in such a manner that the portion of the pressure generating tube 4 is allowed to move in a direction along the back face of the rear wall portion 10 (downward). The second tube receiving portion 50C is configured to extend inward in the vehicle width direction inclining rearward. A depth of the second tube receiving portion 50C is larger than the outer diameter (diameter) of the pressure generating tube 4. Accordingly, heights of the rear wall portion 10 and the groove side wall portion 54b that extend vertically from the groove bottom wall portion 54a are larger than the outer diameter (diameter) of the pressure generating tube 4. The pressure generating tube 4 is received in the second tube receiving portion 50C preferably in such a manner that the pressure generating tube 4 abuts both the rear wall portion 10 and the groove bottom wall portion 54a (abuts two faces) and more preferably in such a manner that the pressure generating tube 4 further abuts the groove side wall portion 54b as well (abuts three faces).

As shown in FIG. 12 and FIG. 13, the tube retaining member 40 comprises the intermediate piece portion 42 extending downward from the rear end portion of the projecting wall portion 41, the lower piece portion 46 extending rearward from the lower end portion of the intermediate piece portion 42 and being put through the hole portion 18, and the rear piece portion 47 extending upward from the rear end portion of the lower end portion 46. The intermediate piece portion 42, the lower piece portion 46 and the rear piece portion 47 are integrally formed (not shown in FIG. 1 and FIG. 10). An upper portion of the rear piece portion 47 is disposed above the hole portion 18 and can be connected to a part disposed rearward. Thus, the tube retaining member 40 is protected by the intermediate piece portion 42, the lower piece portion 46 and the rear piece portion 47. It should be noted that the intermediate piece portion 42, the lower piece portion 46 and the rear piece portion 47 as are described constitute a modified example of the second tube receiving portion formed by the tube retaining member 40.

As has been described, the portion of the pressure generating tube 4 that is disposed to extend through the rear wall portion 10 to the back face of the rear wall portion 10 is received and protected by a set of the intermediate piece portion 42, the lower piece portion 46 and the rear piece portion 47, the first tube receiving portion 50A, the second tube receiving portion 50B and the second tube receiving portion 50C, as the pressure generating tube 4 extends from the hole portion 18 to the pressure sensor 5.

The collision detecting structure 1 of the embodiment of the present invention has a feature that the collision detecting structure comprises the pressure generating tube 4 disposed to extend in the vehicle width direction, the rear wall portion 10 in a plate-like shape disposed on the back side of the pressure generating tube 4, the tube compressing member 20 disposed frontward of the pressure generating tube 4 and including the projecting wall portion 21 in a plate-like shape extending in the vehicle front-rear direction, and the tube retaining member 40 disposed opposite to the projecting wall portion 21 and retaining the pressure generating tube 4 disposed between the projecting wall portion 21 and the tube retaining member 40.

As a result, the collision detecting structure 1 has the projecting wall portion 21 of the tube compressing portion 20 in such a plate-like shape as extends frontward and thus enables preventing a delay in detecting a collision, which could happen to a collision detecting structure using a foamed material.

In addition, the collision detecting structure 1 can retain the pressure generating tube 4 with the tube retaining member 40 and thus enables preventing the pressure generating tube 4 from displacing while the vehicle is running or on the vehicle colliding, which contributes to preventing failure to detect a collision of the vehicle.

In addition, the collision detecting structure 1 does not use a foamed material and thus can prevent the pressure generating tube 4 or other components from breaking due to friction caused by vibration of the vehicle that is running.

In addition, the collision detecting structure 1 has a feature of the tube compressing portion 20 and the rear wall portion 10 being integrally formed and the tube retaining member 40 securely engaging with the rear wall portion 10 and the tube compressing portion 20.

As a result, since the collision detecting structure 1 includes the tube compressing portion 20 and the rear wall portion 10 which are integrally formed, the collision detecting structure 1 can prevent a defect such as a delay in detecting a collision caused by a defective gap around the pressure generating tube 4.

In addition, since the collision detecting structure 1 has the tube retaining member 40 securely engaging with the rear wall portion 10 and the projecting wall portion 20, the collision detecting structure 1 is easily assembled.

On top of it, the collision detecting structure 1 can reliably prevent the pressure generating tube 4 from coming off.

In addition, the collision detecting structure 1 has a feature of the tube retaining member 40 securely engaging with a rear side portion of the rear wall portion 10, the rear wall portion 10 including the release prevention portion 13 formed thereon and being configured to be deformable in a manner that the tube retaining member 40 can securely engage with the rear wall portion 10 and prevent the tube retaining member 40 from coming off from the rear wall portion 10.

As a result, the collision detecting structure 1 with the release prevention portion 13 can reliably prevent the tube retaining member 40 from coming off from the rear wall portion 10.

In addition, the collision detecting structure 1 has a feature of the tip portion of the projecting wall portion 21 being offset in the upper-lower direction toward a side of the projecting wall portion 21 where the pressure generating tube is relative to the base end portion of the projecting wall portion 21 closer to the rear wall portion 10. As a result, the collision detecting structure 1 is capable of transforming a head-on collision load F to be applied on the vehicle colliding (head-on collision) into a moment M in the rotation direction applied to the projecting wall portion 21 instead of a buckling load applied to the projecting wall portion 21 and reliably detecting the collision.

In addition, the collision detecting structure 1 has a feature of the tube compressing portion including the compressing wall portion 24 extending from the projecting wall portion 21 and on a side of the projecting wall portion 21 where the pressure generating tube 4 is, and the pressure generating tube 4 being compressed between the compressing wall portion 24 and the rear wall portion 10.

As a result, the collision detecting structure 1 is capable of reliably detecting a collision by quickly compressing the pressure generating tube 4 with the compressing wall portion 24 on the vehicle colliding.

In addition, the collision detecting structure 1 of the embodiment of the present invention has a feature of the collision detecting structure 1 comprising the pressure generating tube 4 disposed to extend in the vehicle width direction, the rear wall portion 10 in a plate-like shape disposed on the rear side of the pressure generating tube 4, and the tube compressing portion 20 disposed frontward of the pressure generating tube 4 and including the projecting wall portion 21 in a plate-like shape extending in the vehicle front-rear direction, wherein the pressure generating tube 4 is compressed between the tube compressing portion 20 and the rear wall portion 10 on the vehicle colliding and a part of the rear wall portion 10 is a large cross section area portion having a larger cross section area when the rear wall portion 10 is viewed from a side than the other general cross section portion of the rear wall portion 10 does. As a result, since the collision detecting structure 1 has the rear wall portion 10 whose stiffness is increased by the large cross section area portion and which generates a compressive pressure applied to the pressure generating tube 4, the collision detecting structure 1 is capable of reliably detecting a collision.

On top of it, the collision detecting structure 1 can have a better design of a bumper and a better lay-out of the bumper together with other components around the bumper, compared with a collision detecting structure with the rear wall portion having a cross section homogeneously increased.

In addition, the collision detecting structure 1 has a feature of the large cross section area portion being formed to extend rearward from at least one of the upper end portion and the lower end portion of the rear wall portion 10 and disposed outward in the upper-lower direction of the bumper beam 2.

As a result, the collision detecting structure 1 ensures that the rear wall portion 10 has an increased stiffness while there remains a space between the bumper beam 2 and the rear wall portion 10.

In addition, the collision detecting structure 1 has a feature of the projecting wall portion 21 being formed integrally with the rear wall portion 10 through the hinge portion 30.

As a result, the collision detecting structure 1 has the tube compressing portion 20 pivoting smoothly when the vehicle is in collision and is capable of preventing the pressure generating tube 4 from displacing due to the tube compressing portion 20 pivoting.

On top of it, since the collision detecting structure 1 has the hinge portion 30 which functions as a joint portion between the rear wall portion 10 and the projecting wall portion 21 and has a lower stiffness while having the rear wall portion 10 whose stiffness is increased by the large cross section area portion, the collision detecting structure 1 is capable of further reliably compressing the pressure generating tube 4.

In addition, the collision detecting structure 1 has a feature of the hinge portion 30 comprising the first wall portion (upper wall portion 31) extending frontward from the rear wall portion 10 and the second wall portion (front wall portion 32) joining the front end portion of the first wall portion to the rear end portion of the projecting wall portion 21. Accordingly, the collision detecting structure 1 has the point $P_1$ that is the joint position of the first wall portion and the second wall portion and works as a pivot centre on which the tube compressing portion 20 pivots.

As a result, compared with a collision detecting structure having a point $P_2$ that is an intersection point between the rear wall portion 10 and an extended line of the projecting wall portion 21 and works as a pivot centre of the tube compressing portion 20, the collision detecting structure 1 can have the tube compressing wall portion 20 pivoting by a larger angle when the same head-on collision load is applied. Therefore, the collision detecting structure 1 can increase the load to be applied by the tube compressing portion 20 to the pressure generating tube 4, which contributes to improving the performance of the collision detecting structure 1 detecting a collision.

In addition, the collision detecting structure 1 has a feature of the collision detecting structure 1 further comprising the tube retaining member 40 that is disposed opposite to the projecting wall 21 and configured to retain the pressure generating tube 4 between the projecting wall portion 21 and the tube retaining member 40, wherein the tube compressing wall portion 20 comprises the front wall portion 22 extending in the upper-lower direction from the front end portion of the projecting wall portion 21, and the tube retaining member 40 gets securely engaged with the front wall portion 22 from a back side of the front wall portion 22.

As a result, the collision detecting structure 1 is capable of reliably preventing the tube retaining member 40 from coming off from the front wall portion 22.

In addition, the collision detecting structure 1 has a feature of the tip portion of the projecting wall portion 21 being offset in the upper-lower direction toward a side of the projecting wall portion where the pressure generating tube 4 is relative to the base end portion of the projecting wall portion 21 and the length $L_2$ of the tube retaining member 40 extending frontward from the rear wall portion 10 being longer than the length $L_1$ in the vehicle front-rear direction of the tube compressing portion 20.

As a result, the collision detecting structure 1 is capable of reliably preventing the tube retaining member 40 from coming off from the front wall portion 22 when the vehicle is in collision.

The collision detecting structure 1 of the embodiment of the present invention has a feature of the collision detecting structure 1 comprising the pressure generating tube 4 disposed to extend in the vehicle width direction, the rear wall portion 10 in a plate-like shape disposed on the back side of the pressure generating tube 4, and the tube compressing portion 20 disposed frontward of the pressure generating tube 4 and including the projecting wall portion 21 in a plate-like shape extending in the vehicle front-rear direction, wherein the pressure generating tube 4 is compressed between the tube compressing portion 20 and the rear wall portion 10 when the vehicle is in collision, and the rear wall portion 10 includes plural fixing portions 16 formed thereon that are fixed to a member disposed on the back side of the rear wall portion 10 and are arrayed in the vehicle width direction, and further includes a pair of the portions 10B being outward in the vehicle width direction of a pair of right and left outermost fixing portions 16 in the vehicle width direction and the portion 10A being inward in the vehicle width direction of the pair of the right and left outermost fixing portions 16 with the stiffness' of the pair of the portions 10B being lower than the stiffness of the portion 10A.

As a result, each of the portions 10B of the collision detection structure 1 displaces more when a load is applied to the portion 10B than a corresponding portion 10B whose stiffness is as high as that of the portion 10A would do when the same load is applied to it and thus the collision detecting structure 1 can detect a collision on a corner portion of the vehicle (portion 10B) more reliably with the relatively simple structure.

On top of it, since the stiffness of the portions 10B is lower than the stiffness of the portion 10A, the collision detecting structure 1 can prevent the portion 10B from breaking when the vehicle is in a relatively weak collision. Moreover, the collision detecting structure 1 can have an increased degree of freedom of designing though its weight and production cost do not increase, compared with a collision detecting structure having a rear wall portion over which the stiffness is increased.

In addition, the collision detecting structure 1 has a feature of the rear wall portion 10 being made of different materials and including a pair of the portions 10B located outward in the vehicle width direction of a pair of right and left outermost fixing portions 16 in the vehicle width direction and the portion 10A located inward in the vehicle width direction of the pair of the right and left outermost fixing portions 16 with the stiffness of the pair of the portions 10B being lower than the stiffness of the portion 10A.

As a result, each of the portions 10B of the collision detection structure 1 displaces more when a load is applied to the portion 10B than the portion 10A does when the same load is applied, and thus the collision detecting structure 1 can detect a collision on a corner portion of the vehicle more reliably with the relatively simple structure.

On top of it, since the stiffness of the portions 10B is lower than the stiffness of the portion 10A, the collision detecting structure 1 can prevent the portion 10B from breaking when the vehicle makes a relatively weak collision. Moreover, the collision detecting structure 1 can have an increased degree of freedom of designing though its weight and production cost do not increase, compared with a collision detecting structure having a rear wall portion over which the stiffness is increased.

In addition, the collision detecting structure 1 has a feature of the rear wall portion 10 having the cross section when it is viewed from a side whose cross section area varies over its length and including a pair of the portions 10B disposed outward in the vehicle width direction of a pair of right and left outermost fixing portions 16 in the vehicle width direction and the portion 10A inward in the vehicle width direction of the pair of the right and left outermost fixing portions 16 with the stiffness of the pair of the portions 10B being lower than the stiffness of the portion 10A.

As a result, each of the portions 10B of the collision detection structure 1 when a load is applied to the portion 10B displaces more than the portion 10B whose stiffness is as high as that of the portion 10A and to which the same load is applied does and thus the collision detecting structure 1 can detect a collision on a corner portion of the vehicle more reliably with the relatively simple structure.

Moreover, the collision detecting structure 1 can have an increased freedom of designing though its weight and production cost do not increase, compared with a collision detecting structure having a rear wall portion over which the stiffness is increased.

In addition, the collision detecting structure 1 has a feature of a part of the rear wall portion 10 having a large cross section area portion whose cross section when viewed from a side has a larger cross section area than other general portion and the large section of the portion 10B of the rear wall portion 10 located outward in the vehicle width direction of the outermost fixing portion has a cut-out portion 17.

As a result, the collision detecting structure 1 can have the portion 10B with the cut-out portion 17 displacing more when a load is applied to the portion 10B than the portion 10A does when the same load is applied to the portion 10A and has a better capability of detecting a collision with such a simple structure as the cut-out portion 17

In addition, the collision detecting structure 1 has a feature of the rear wall portion 10 having the cut-out portion 18a or the hole portion 18 formed in the vicinity of the base end portion of the hinge portion 30 disposed outward in the vehicle width direction of the outermost fixing portions 16 while the projecting wall portion 21 is integrally formed with the rear wall portion 10 through the hinge portion 30.

As a result, the collision detecting structure 1 reduces the stiffness of the rear wall portion 10 with the cut-out portion 18a or the hole portion 18 to be closer to the stiffness of the hinge portion 30 and can prevent a crack generated at a joint portion between the rear wall portion 10 and the hinge portion 30 from growing longer to propagate.

In addition, the collision detecting structure 1 has a feature of the hinge portion 30 comprising the first wall portion 31 extending frontward from the rear wall portion 10, the second wall portion 32 joining the front end portion of the first wall portion 31 to the rear end portion of the projecting wall portion 21 and the third wall portion 33 joining the first wall portion 31, the second wall portion 32 and the rear wall 10 at the vehicle width end portion of the hinge portion 30 while the projecting wall portion 21 is integrally formed with the rear wall portion 10 through the hinge portion 30.

As a result, the collision detecting structure 1 increases the stiffness of the hinge portion 30 with the third wall portion 33 to be close to the stiffness of the rear wall portion 10 and can prevent a crack generated at a joint portion between the rear wall portion 10 and the hinge portion 30 from growing longer to propagate.

The collision detecting structure 1 of the embodiment of the present invention has a feature of the collision detecting structure 1 comprising the pressure generating tube 4 disposed to extend in the vehicle width direction, the rear wall portion 10 disposed on the back side of the pressure generating tube 4, the tube compressing portion 20 disposed frontward of the pressure generating tube 4 and including the projecting wall portion 21 in a plate-like shape extending in the vehicle front-rear direction, and the tube retaining member 40 disposed opposite to the projecting wall portion 21 and retaining the pressure generating tube 4 between the projecting wall portion 21 and the tube retaining member 40, wherein there is a tube fitting error prevention portion 41a formed at a position on at least one of the tube compressing portion 20 and the tube retaining member 40, the position being different from where the pressure generating tube 4 is disposed.

As a result, the collision detecting structure 1 can have such a tube fitting error prevention portion 41a as makes, for example, a gap between the projecting wall portion 21 and the tube retaining member 40 smaller than the diameter of the pressure generating tube 4 and thus an operator recognizes that the pressure generating tube 4 is not disposed at a right position if the operator feels the fitting resistance when fitting the pressure generating tube 4, which reliably prevents the tube fitting error. Furthermore, the collision detecting structure 1 with the tube fitting error prevention portion 41a is capable of guaranteeing a predetermined performance with relatively few man-hours and a relatively low cost.

In addition, the collision detecting structure 1 has a feature of the tube fitting error prevention portion 41a making a gap between the projecting wall portion 21 and the tube retaining member 40 smaller than the diameter of the pressure generating tube 4.

Thus, the collision detecting structure 1 can prevent the pressure generating tube 4 from being wrongly fitted with a relatively simple structure added.

In addition, the collision detecting structure 1 has a feature of the tube retaining member 40 securely engaging with the rear wall portion 10 and the tube fitting error prevention portion 41a formed at the same position in the vehicle width direction as where the tube retaining member 40 securely engages with the rear wall portion 10.

As a result, the collision detecting structure 1 can reliably perform the function of preventing the tube fitting error while suppressing an influence of curvature of the tube retaining member 40 to a minimum. Accordingly, since the collision detecting structure 1 has the securely engaging portion that prevents the tube fitting error prevention portion 41a from deforming, the collision detecting structure 1 can reliably prevent the pressure generating tube 4 from being fitted between the tube compressing portion 20 and the tube fitting error prevention portion 41a.

In addition, the collision detecting structure 1 has a feature of at least one of the rear wall portion 10, the tube compressing portion 20 and the tube retaining 40 having the tube position checking portion 41b formed therethrough, through which the pressure generating tube 4 can be seen.

As a result, the collision detecting structure 1 enables checking that the pressure generating tube 4 is fitted at a right position without performing an operation test.

In addition, the collision detecting structure 1 has a feature of the tube fitting error prevention portions 41a and the tube position checking portions 41b which are disposed alternately in the vehicle width direction.

As a result, the collision detecting structure 1 enables reliably checking that the pressure generating tube 4 is fitted at the right position.

In addition, the collision detecting structure 1 of the embodiment of the present invention has a feature of the collision detecting structure 1 comprising the pressure generating tube 4 disposed to extend in the vehicle width direction, the rear wall portion 10 disposed on the back side of the pressure generating tube 4, the tube compressing portion 20 disposed frontward of the pressure generating tube 4 and including the projecting wall portion 21 extending in the vehicle front-rear direction, and the tube retaining member 40 disposed opposite to the projecting wall portion 21 and retaining the pressure generating tube 4 between the projecting wall portion 21 and the tube retaining member 40, wherein the tube position checking portion 41b, through which the pressure generating tube 4 can be seen, is formed through at least one of the rear wall portion 10, the tube compressing portion 20 and the tube retaining 40.

As a result, the collision detecting structure 1 enables checking that the pressure generating tube 4 is disposed at the right position without performing an operation test.

The collision detecting structure 1 of the embodiment of the present invention has a feature of the collision detecting structure 1 comprising the pressure generating tube 4 disposed to extend in the vehicle width direction, the rear wall portion 10 in a plate-like shape disposed on the back side of the pressure generating tube 4, the tube compressing portion 20 disposed frontward of the pressure generating tube 4 and including the projecting wall portion 21 in a plate-like shape extending in the vehicle front-rear direction, and the pressure sensor 5 mounted on the back side of the rear wall portion 10, wherein the pressure generating tube 4 is disposed to extend on the back face of the rear wall portion 10 from the vehicle width direction end portion of the rear wall portion 10 and connected with the pressure sensor 5, and on the back face of the rear wall portion 10 are formed the first tube receiving portion 50A in which a portion of the pressure generating tube 4 is received in a manner that the portion of the pressure generating tube 4 is allowed to move rearward and/or the second tube receiving portions 50B, 50C in which a portion of the pressure generating tube 4 is received in a manner that the portion of the pressure generating tube 4 is allowed to move along the back face of the rear wall portion 10.

As a result, since the collision detecting structure 1 has a portion of the pressure generating tube 4 received in the first tube receiving portion 50A and/or the second tube receiving portions 50B, 50C, the collision detecting structure 1 can absorb length variation of the pressure generating tube 4 and simultaneously protect the pressure generating tube 4.

Especially when the collision detecting structure 1 is fitted with both the first tube receiving portion 50A and the second tube receiving portions 50B, 50C, the pressure generating tube 4 can be reliably prevented from coming off as well.

In addition, the collision detecting structure 1 has a feature of the rear wall portion 10 having the first tube receiving portion 50A formed thereon, which is in a groove-like shape with a bottom wall portion being a portion of the rear wall portion 10 and has a depth larger than the diameter of the pressure generating tube 4.

As a result, the first tube receiving portion 50A of the collision detecting structure 1 is capable of absorbing the length variation of the pressure generating tube 4 and reliably protecting the pressure generating tube 4.

In addition, the collision detecting structure 1 has a feature of the rear wall portion 10 having the second tube receiving portions 50B, 50C formed thereon, each of which is in a groove-like shape with a bottom wall portion extending rearward from the rear wall portion 10 and having a depth larger than the diameter of the pressure generating tube 4.

As a result, the second tube receiving portions 50B, 50C of the collision detecting structure 1 is capable of absorbing the length variation of the pressure generating tube 4 and reliably protecting the pressure generating tube 4.

In addition, the collision detecting structure 1 has a feature of the first tube receiving portion 50A or the second tube receiving portion 50C being formed in the vicinity of at least one of a position on the back side of the rear wall portion 10 to which the pressure generating tube 4 is disposed to extend through the rear wall portion 10 and a position on the back side of the rear wall portion 10 at which the pressure generating tube 4 is connected with the pressure sensor 5.

As a result, the collision detecting structure 1 is capable of easily setting a tube passage along which the pressure generating tube 4 is disposed to extend.

In addition, the collision detecting structure 1 has a feature of the first tube receiving portion 50A or the second tube receiving portions 50C being formed in the vicinity of both of the position on the back side of the rear wall portion 10 to which the pressure generating tube 4 is disposed to extend through the rear wall portion 10 and the position on the back side of the rear wall portion 10 at which the pressure generating tube 4 is connected with the pressure sensor 5, and the first tube receiving portion 50A or the second tube receiving portions 50C that are formed having three faces which the pressure generating tube 4 abut.

As a result, the collision detecting structure 1 is capable of reliably protecting the pressure generating tube 4.

Although the embodiment of the present invention has been described above, it should be noted that the present invention is not limited to the embodiment as described above and may be modified within a technical scope of the present invention. For instance, the collision detecting structure 1 may be turned upside down.

In addition, the large cross section area portions (flange portions) may extend frontward from upper and lower edge portions of the rear wall portion 10.

In addition, the hole portion 18 may be a cut-out portion opening to a vehicle width direction end portion of the rear wall portion 10 and be formed on an upper side of a base end portion of the hinge portion 30 in the rear wall portion 10.

In addition, the portion 10B may be made of foamed material or in a hollow shape in order to make the stiffness of the portion 10B lower than that of the portion 10A.

In addition, if the stiffness of the portion 10B is made lower than that of the portion 10A by changing materials, the material of which at least a part of the portion 10B is made may be changed to a material that is different from one of which the portion 10A is made.

In addition, a gap length between the projecting wall portions 21, 41 in the tube fitting error prevention portion may be shorter than or equal to a difference between the outer diameter (diameter) and an inner diameter (diameter) of the pressure generating tube 4.

In addition, the projecting wall portions 21, 41 in the tube fitting error prevention portion may have comb-like projecting portions that project alternately from the projecting wall portions 21, 41 when viewed from a side. In this configuration, a gap length between adjacent comb-like projecting portions of the projecting wall portions 21, 41 is preferably smaller than the outer diameter (diameter) of the pressure generating tube 4.

The tube position checking portion may be formed through the rear wall portion 10 or the projecting wall portion 21. The tube position checking portion is not limited to a hole and may be made by having a portion of the rear wall portion 10, the projecting wall portion 21 or the tube retaining portion 40 made of a transparent resin.

In addition, the second tube receiving portion 50B may have the groove side wall portion 53 formed of a separate member separated from the other portions of the rear wall portion 10 and be fitted to the side flange wall portion 51b and the lower flange wall portion 51c.

In addition, the collision detecting structure 1 may have either the first tube receiving portion 50A or the second tube receiving portions 50B, 50C disposed on a portion of the back face of the rear wall portion 10 to which the pressure generating tube 4 is extended through the rear wall portion 10.

In addition, the collision detecting structure 1 may comprise the second tube receiving portion in the vicinity of the hole portion 18 instead of the first tube receiving portion 50A and may comprise the first tube receiving portion in the vicinity of the pressure sensor 5 instead of the second tube receiving portion 50C.

DESCRIPTION OF SIGNS

1 Collision detecting structure
10 Rear wall portion
14 Release prevention portion
20 Tube compressing portion
21 Projecting wall portion
22 Front wall portion
24 Compressing wall portion
30 Hinge portion
31 Upper wall portion (First wall portion)
32 Front wall portion (Second wall portion)
40 Tube retaining member

The invention claimed is:

1. A collision detecting structure comprising;
a pressure generating tube disposed to extend in a vehicle width direction;
a rear wall portion in a plate-like shape disposed on a rear side of the pressure generating tube;
a tube compressing portion disposed frontward of the pressure generating tube and including a projecting wall portion in a plate-like shape extending in a vehicle front-rear direction, and the tube compressing portion is integrally formed with the rear wall portion; and
a tube retaining member disposed opposite to the projecting wall portion and retaining the pressure generating tube between the projecting wall portion and the tube retaining portion.

2. A collision detecting structure comprising;
a pressure generating tube disposed to extend in a vehicle width direction;
a rear wall portion in a plate-like shape disposed on a rear side of the pressure generating tube;
a tube compressing portion disposed frontward of the pressure generating tube and including a projecting wall portion in a plate-like shape extending in a vehicle front-rear direction; and
a tube retaining member disposed opposite to the projecting wall portion and retaining the pressure generating tube between the projecting wall portion and the tube retaining portion,
wherein the tube compressing portion and the rear wall portion are integrally formed and the tube retaining member securely engages with the rear wall portion and the projecting wall portion.

3. The collision detecting structure as claimed in claim 2, wherein the tube retaining member securely engages with a rear side portion of the rear wall portion and the rear wall portion includes a release prevention portion formed thereon, the release prevention portion being deformable in a manner that the tube retaining member is allowed to securely engage with the rear wall portion and being configured to prevent the tube retaining member from coming off from the rear wall portion.

4. The collision detecting structure as claimed in claim 2, wherein a tip portion of the projecting wall portion is offset in an upper-lower direction toward a side of the projecting wall portion where the pressure generating tube is relative to a base portion of the projecting wall portion closer to the rear wall portion.

5. The collision detecting structure as claimed in claim 4, wherein the tube compressing portion comprises a compressing wall portion extending from the projecting wall portion and on the side of the projecting wall portion where the pressure generating tube is and the pressure generating tube is compressed between the compressing wall portion and the rear wall portion when a vehicle is in collision.

6. The collision detecting structure as claimed in claim 3, wherein a tip portion of the projecting wall portion is offset in an upper-lower direction toward a side of the projecting wall portion where the pressure generating tube is relative to a base portion of the projecting wall portion closer to the rear wall portion.

7. The collision detecting structure as claimed in claim 6, wherein the tube compressing portion comprises a compressing wall portion extending from the projecting wall portion and on the side of the projecting wall portion where the pressure generating tube is and the pressure generating tube is compressed between the compressing wall portion and the rear wall portion when a vehicle is in collision.

8. A collision detecting structure comprising;
a pressure generating tube disposed to extend in a vehicle width direction;
a rear wall portion in a plate-like shape disposed on a rear side of the pressure generating tube;
a tube compressing portion disposed frontward of the pressure generating tube and including a projecting wall portion in a plate-like shape extending in a vehicle front-rear direction; and
a tube retaining member disposed opposite to the projecting wall portion and retaining the pressure generating tube between the projecting wall portion and the tube retaining portion,
wherein a tip portion of the projecting wall portion is offset in an upper-lower direction toward a side of the projecting wall portion where the pressure generating tube is relative to a base portion of the projecting wall portion closer to the rear wall portion.

9. The collision detecting structure as claimed in claim 8, wherein the tube compressing portion comprises a compressing wall portion extending from the projecting wall portion and on the side of the projecting wall portion where the pressure generating tube is and the pressure generating tube is compressed between the compressing wall portion and the rear wall portion when a vehicle is in collision.

* * * * *